US009240094B2

(12) United States Patent
Acres

(10) Patent No.: US 9,240,094 B2
(45) Date of Patent: Jan. 19, 2016

(54) RAPID PLAY POKER GAMING DEVICE

(75) Inventor: John F. Acres, Las Vegas, NV (US)

(73) Assignee: PATENT INVESTMENT & LICENSING COMPANY, Las Vegas, NV (US)

( * ) Notice: Subject to any disclaimer, the term of this patent is extended or adjusted under 35 U.S.C. 154(b) by 1391 days.

(21) Appl. No.: 12/630,752

(22) Filed: Dec. 3, 2009

(65) Prior Publication Data

US 2011/0136566 A1 Jun. 9, 2011

(51) Int. Cl.

| | |
|---|---|
| ***A63F 9/00*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ............ *G07F 17/32* (2013.01); *G07F 17/3293* (2013.01)

(58) Field of Classification Search

USPC ........... 463/16, 17, 12, 13; 273/274, 292, 304

See application file for complete search history.

(56) References Cited

U.S. PATENT DOCUMENTS

| | | | |
|---|---|---|---|
| 3,684,290 | A | 8/1972 | Wayne |
| 3,751,040 | A | 8/1973 | Carey |
| 4,240,635 | A | 12/1980 | Brown |
| 4,283,709 | A | 8/1981 | Lucero et al. |
| 4,433,844 | A | 2/1984 | Hooker et al. |
| 4,620,707 | A | 11/1986 | Lippincott |
| 4,652,998 | A | 3/1987 | Koza et al. |
| 4,712,799 | A | 12/1987 | Fraley |
| 4,837,728 | A | 6/1989 | Barrie et al. |
| 4,911,449 | A | 3/1990 | Dickinson et al. |
| 5,024,439 | A | 6/1991 | Okada |
| 5,026,058 | A | 6/1991 | Bromley |
| 5,033,744 | A | 7/1991 | Bridgeman et al. |
| 5,046,736 | A | 9/1991 | Bridgeman et al. |
| 5,123,649 | A | 6/1992 | Tiberio |
| 5,152,529 | A | 10/1992 | Okada |
| 5,178,395 | A | 1/1993 | Lovell |
| 5,655,961 | A | 8/1997 | Acres et al. |

(Continued)

FOREIGN PATENT DOCUMENTS

| | | | |
|---|---|---|---|
| CA | 2 442 442 | C | 10/1998 |
| EP | 0 141 264 | | 5/1985 |
| EP | 1 170 041 | A2 | 1/2002 |
| EP | 1 938 872 | A2 | 7/2008 |
| WO | 2005029279 | | 3/2005 |

(Continued)

OTHER PUBLICATIONS

Acres, John, Measuring the Player Experience: What a Squiggly Line Can Tell You, Inside Edge / Slot Manager, Jan. / Feb. 2009, pp. 28-29.
Acres, John, The Future of Gaming, Where Will You be in 10 Years?, Slot Operations Management / Casino Enterprise Management, Jul. 2007, pp. 8-10, 12.

*Primary Examiner* — Reginald Renwick
(74) *Attorney, Agent, or Firm* — Marger Johnson

(57) ABSTRACT

Embodiments of this concept are directed to a video poker gaming device that deals five cards to a player and selects five more cards that represent the possible cards used in a later draw. From these ten cards, the gaming device if a winning combination above a threshold amount is possible. If such a winning combination is not possible, in some embodiments, the device automatically ends the game and deals a new hand. If a win over the threshold amount is possible, the gaming device allows the player to hold and draw cards. This increases the speed of play of the poker game and focuses game play on hands where winning combinations are likely.

31 Claims, 14 Drawing Sheets

(56) References Cited

U.S. PATENT DOCUMENTS

| | | | | |
|---|---|---|---|---|
| 5,655,965 | A | 8/1997 | Takemoto et al. | |
| 5,704,835 | A | 1/1998 | Dietz | |
| 5,720,662 | A | 2/1998 | Holmes et al. | |
| 5,758,875 | A | 6/1998 | Giacalone, Jr. | |
| 5,828,862 | A | 10/1998 | Singkomrat et al. | |
| 6,012,983 | A | 1/2000 | Walker et al. | |
| 6,045,129 | A * | 4/2000 | Cooper et al. | 273/292 |
| 6,077,163 | A | 6/2000 | Walker et al. | |
| 6,110,041 | A | 8/2000 | Walker et al. | |
| 6,254,483 | B1 | 7/2001 | Acres | |
| 6,315,662 | B1 | 11/2001 | Jorasch et al. | |
| 6,443,456 | B1 | 9/2002 | Gajor | |
| 6,471,588 | B2 | 10/2002 | Sakamoto | |
| 6,558,255 | B2 | 5/2003 | Walker et al. | |
| 6,575,832 | B1 | 6/2003 | Manfredi et al. | |
| 6,634,922 | B1 | 10/2003 | Driscoll et al. | |
| 6,695,700 | B2 | 2/2004 | Walker et al. | |
| 6,702,670 | B2 | 3/2004 | Jasper et al. | |
| 6,780,104 | B2 | 8/2004 | Fox | |
| 6,878,064 | B2 * | 4/2005 | Huang | 463/30 |
| 6,939,227 | B2 | 9/2005 | Jorasch et al. | |
| 6,939,229 | B2 | 9/2005 | McClintic | |
| 6,998,806 | B2 | 2/2006 | Suzuki | |
| 7,037,195 | B2 | 5/2006 | Schneider et al. | |
| 7,105,736 | B2 | 9/2006 | Laakso | |
| 7,125,333 | B2 | 10/2006 | Brosnan | |
| 7,160,188 | B2 | 1/2007 | Kaminkow et al. | |
| 7,160,189 | B2 | 1/2007 | Walker et al. | |
| 7,169,052 | B2 | 1/2007 | Beaulieu et al. | |
| 7,201,654 | B1 | 4/2007 | Jarvis et al. | |
| 7,210,998 | B2 | 5/2007 | Kazaoka et al. | |
| 7,258,613 | B2 | 8/2007 | Lucchesi et al. | |
| 7,264,243 | B2 | 9/2007 | Yoseloff et al. | |
| 7,303,475 | B2 | 12/2007 | Britt et al. | |
| 7,355,112 | B2 | 4/2008 | Laakso | |
| 7,374,486 | B2 | 5/2008 | Baerlocher | |
| 7,458,892 | B2 | 12/2008 | Walker et al. | |
| 7,585,222 | B2 | 9/2009 | Muir | |
| 7,594,849 | B2 | 9/2009 | Cannon | |
| 7,628,691 | B2 | 12/2009 | Luciano et al. | |
| 7,806,761 | B2 | 10/2010 | Walker et al. | |
| 7,874,911 | B2 | 1/2011 | Walker et al. | |
| 7,963,844 | B2 | 6/2011 | Walker et al. | |
| 7,980,934 | B2 | 7/2011 | Shuster et al. | |
| 8,047,908 | B2 | 11/2011 | Walker et al. | |
| 8,186,682 | B2 | 5/2012 | Amaitis et al. | |
| 8,197,324 | B2 | 6/2012 | Walker et al. | |
| 8,475,254 | B2 | 7/2013 | Acres | |
| 2002/0082076 | A1 | 6/2002 | Roser et al. | |
| 2002/0142815 | A1 | 10/2002 | Candelore | |
| 2002/0147040 | A1 | 10/2002 | Walker et al. | |
| 2003/0017865 | A1 | 1/2003 | Beaulieu et al. | |
| 2003/0078101 | A1 | 4/2003 | Schneider et al. | |
| 2003/0092484 | A1 | 5/2003 | Schneider et al. | |
| 2003/0114217 | A1 | 6/2003 | Walker et al. | |
| 2003/0119576 | A1 | 6/2003 | McClintic et al. | |
| 2003/0130042 | A1 | 7/2003 | Ollins | |
| 2003/0137109 | A1 | 7/2003 | Vancura | |
| 2003/0190944 | A1 | 10/2003 | Manfredi et al. | |
| 2003/0220138 | A1 | 11/2003 | Walker et al. | |
| 2003/0232640 | A1 | 12/2003 | Walker et al. | |
| 2004/0002388 | A1 | 1/2004 | Larsen et al. | |
| 2004/0248642 | A1 | 12/2004 | Rothschild | |
| 2005/0119052 | A1 | 6/2005 | Russell et al. | |
| 2005/0215314 | A1 | 9/2005 | Schneider et al. | |
| 2005/0227760 | A1 | 10/2005 | Viazny et al. | |
| 2005/0239541 | A1 | 10/2005 | Jorasch et al. | |
| 2006/0025207 | A1 | 2/2006 | Walker et al. | |
| 2006/0052153 | A1 | 3/2006 | Viazny et al. | |
| 2006/0068903 | A1 | 3/2006 | Walker et al. | |
| 2006/0105836 | A1 | 5/2006 | Walker et al. | |
| 2006/0148559 | A1 | 7/2006 | Jordan et al. | |
| 2006/0160598 | A1 | 7/2006 | Wells et al. | |
| 2006/0160610 | A1 | 7/2006 | Potts | |
| 2006/0211496 | A1 | 9/2006 | Manz | |
| 2006/0229127 | A1 | 10/2006 | Walker et al. | |
| 2006/0237905 | A1 | 10/2006 | Nicely et al. | |
| 2006/0240890 | A1 | 10/2006 | Walker et al. | |
| 2006/0247031 | A1 | 11/2006 | Walker et al. | |
| 2006/0252510 | A1 | 11/2006 | Walker et al. | |
| 2006/0252512 | A1 | 11/2006 | Walker et al. | |
| 2006/0252519 | A1 * | 11/2006 | Walker et al. | 463/25 |
| 2006/0287075 | A1 | 12/2006 | Walker et al. | |
| 2007/0001396 | A1 | 1/2007 | Walker et al. | |
| 2007/0015564 | A1 | 1/2007 | Walker et al. | |
| 2007/0049369 | A1 | 3/2007 | Kuhn et al. | |
| 2007/0060254 | A1 | 3/2007 | Muir | |
| 2007/0060274 | A1 | 3/2007 | Rowe et al. | |
| 2007/0060295 | A1 | 3/2007 | DeMar et al. | |
| 2007/0060323 | A1 | 3/2007 | Isaac et al. | |
| 2007/0060334 | A1 | 3/2007 | Rowe | |
| 2007/0066377 | A1 | 3/2007 | Van Asdale | |
| 2007/0087822 | A1 | 4/2007 | Van Luchene | |
| 2007/0105612 | A1 | 5/2007 | Fotevski | |
| 2007/0105615 | A1 | 5/2007 | Lind | |
| 2007/0106553 | A1 | 5/2007 | Jordan et al. | |
| 2007/0111772 | A1 | 5/2007 | Shuster et al. | |
| 2007/0180371 | A1 | 8/2007 | Kammler | |
| 2007/0184896 | A1 | 8/2007 | Dickerson | |
| 2007/0205556 | A1 | 9/2007 | Roemer et al. | |
| 2007/0218974 | A1 | 9/2007 | Patel et al. | |
| 2007/0254732 | A1 | 11/2007 | Walker et al. | |
| 2007/0281775 | A1 | 12/2007 | Kashima | |
| 2008/0026826 | A1 | 1/2008 | Groswirt | |
| 2008/0070695 | A1 | 3/2008 | Baerlocher et al. | |
| 2008/0096632 | A1 | 4/2008 | Okada | |
| 2008/0096636 | A1 | 4/2008 | Power | |
| 2008/0102946 | A1 | 5/2008 | Amour | |
| 2008/0113749 | A1 | 5/2008 | Williams et al. | |
| 2008/0113777 | A1 | 5/2008 | Anderson | |
| 2008/0132328 | A1 | 6/2008 | Yoshioka | |
| 2008/0153580 | A1 | 6/2008 | Beadell et al. | |
| 2008/0161085 | A1 | 7/2008 | Hansen | |
| 2008/0161099 | A1 | 7/2008 | Sines et al. | |
| 2008/0182655 | A1 | 7/2008 | DeWaal et al. | |
| 2008/0220861 | A1 | 9/2008 | Okada | |
| 2008/0242394 | A1 | 10/2008 | Sakuma | |
| 2008/0280674 | A1 | 11/2008 | Sakuma | |
| 2008/0287186 | A1 | 11/2008 | Sakuma | |
| 2008/0318656 | A1 | 12/2008 | Walker et al. | |
| 2009/0117981 | A1 | 5/2009 | Yoshizawa | |
| 2009/0137312 | A1 | 5/2009 | Walker et al. | |
| 2009/0233682 | A1 | 9/2009 | Kato et al. | |
| 2009/0325669 | A1 | 12/2009 | Kelly et al. | |
| 2009/0325670 | A1 | 12/2009 | Kelly et al. | |
| 2010/0056248 | A1 | 3/2010 | Acres | |
| 2010/0075741 | A1 | 3/2010 | Aoki et al. | |
| 2010/0130280 | A1 | 5/2010 | Arezina et al. | |
| 2010/0285867 | A1 | 11/2010 | Okada | |
| 2011/0053675 | A1 | 3/2011 | Aoki et al. | |
| 2011/0117987 | A1 | 5/2011 | Aoki et al. | |
| 2011/0183753 | A1 | 7/2011 | Acres et al. | |
| 2011/0281632 | A1 | 11/2011 | Okada | |
| 2011/0294563 | A1 | 12/2011 | Jaffe | |
| 2012/0077565 | A1 | 3/2012 | Barbalet | |
| 2012/0115566 | A1 | 5/2012 | Fujisawa et al. | |
| 2012/0172108 | A1 | 7/2012 | Acres | |
| 2012/0172130 | A1 | 7/2012 | Acres | |
| 2012/0190425 | A1 | 7/2012 | Barbalet | |

FOREIGN PATENT DOCUMENTS

| | | | |
|---|---|---|---|
| WO | 2005029287 | | 3/2005 |
| WO | 2005099841 | A1 | 10/2005 |
| WO | 2006104731 | A2 | 10/2006 |
| WO | 2006121663 | A2 | 11/2006 |
| WO | 2006135608 | A2 | 12/2006 |
| WO | 2008024705 | | 2/2008 |
| WO | WO 2008/024556 | A2 | 2/2008 |
| WO | 2008027429 | A2 | 3/2008 |

* cited by examiner

RAPID PLAY POKER GAMING DEVICE

RELATED APPLICATIONS

This application is commonly assigned with U.S. patent application Ser. No. 12/630,767, to John F. Acres, filed concurrently herewith, for GAMING DEVICE HAVING ADVANCE GAME INFORMATION ANALYZER. The disclosure of the above-listed application is incorporated herein by reference in its entirety for all purposes.

FIELD OF THE INVENTION

This disclosure relates generally to electronic gaming devices, and more particularly to video poker gaming devices that are configured to allow a rapid speed of game play.

BACKGROUND

Video draw poker is a popular casino game. Players spend hours wagering on the game, largely due to tradition and simplicity of the basic rules. That said, deciding which cards to discard on the deal can be challenging, especially for newer players. In a simple game such as Jacks or Better, players must play for the best paying hand with the best chance of receiving any required cards on the draw to achieve the maximum possible awards. Sometimes, deciding which cards to hold and which cards to discard is counter intuitive. That is, sometimes it is more advantageous to go for a higher paying hand even though a player is less likely to achieve it then a lower paying hand.

Also, video poker is a comparatively slow game with an average speed of 6 seconds per game. Because many of the paytables preferred by players don't allow for a large hold percentage (%), casinos often find it difficult to earn enough revenue to justify offering the game. Simple "jacks or better" draw poker, for example, holds only about 0.5% when configured with a 6/9 paytable (that is a paytable that pays 6 times the player's wager for a flush and 9 times a player's wager for a full house) and the player playing the best theoretical strategy. Given that the most popular poker games are played with a typical $1.25 wager, and with only 600 decisions per hour, the casino's profit may amount to only $1.25*600*0.5%=$3.75 per hour.

In order to earn a reasonable return, casinos must cut the amounts awarded for many jackpots, which in turn decreases player interest in the game. Hence, there exists a need for a video poker game that eliminates the drudgery of playing for small wins and simultaneously provides the standard games and paytables players prefer while increasing the hourly profits earned by casinos.

DETAILED DESCRIPTION

Figure 1A:
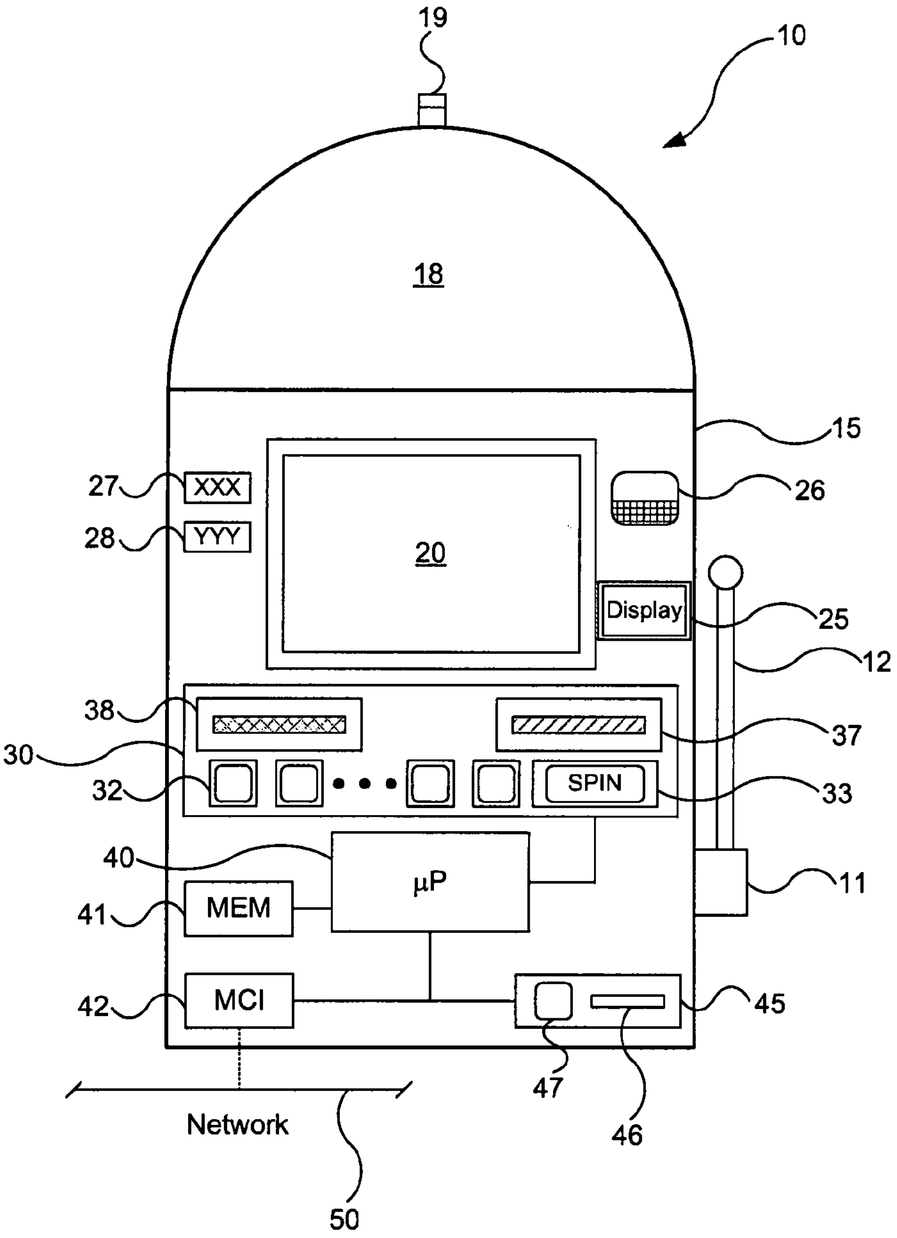
FIG. 1A is a functional block diagram that illustrates a gaming device according to embodiments of the invention.
Figure 1B:
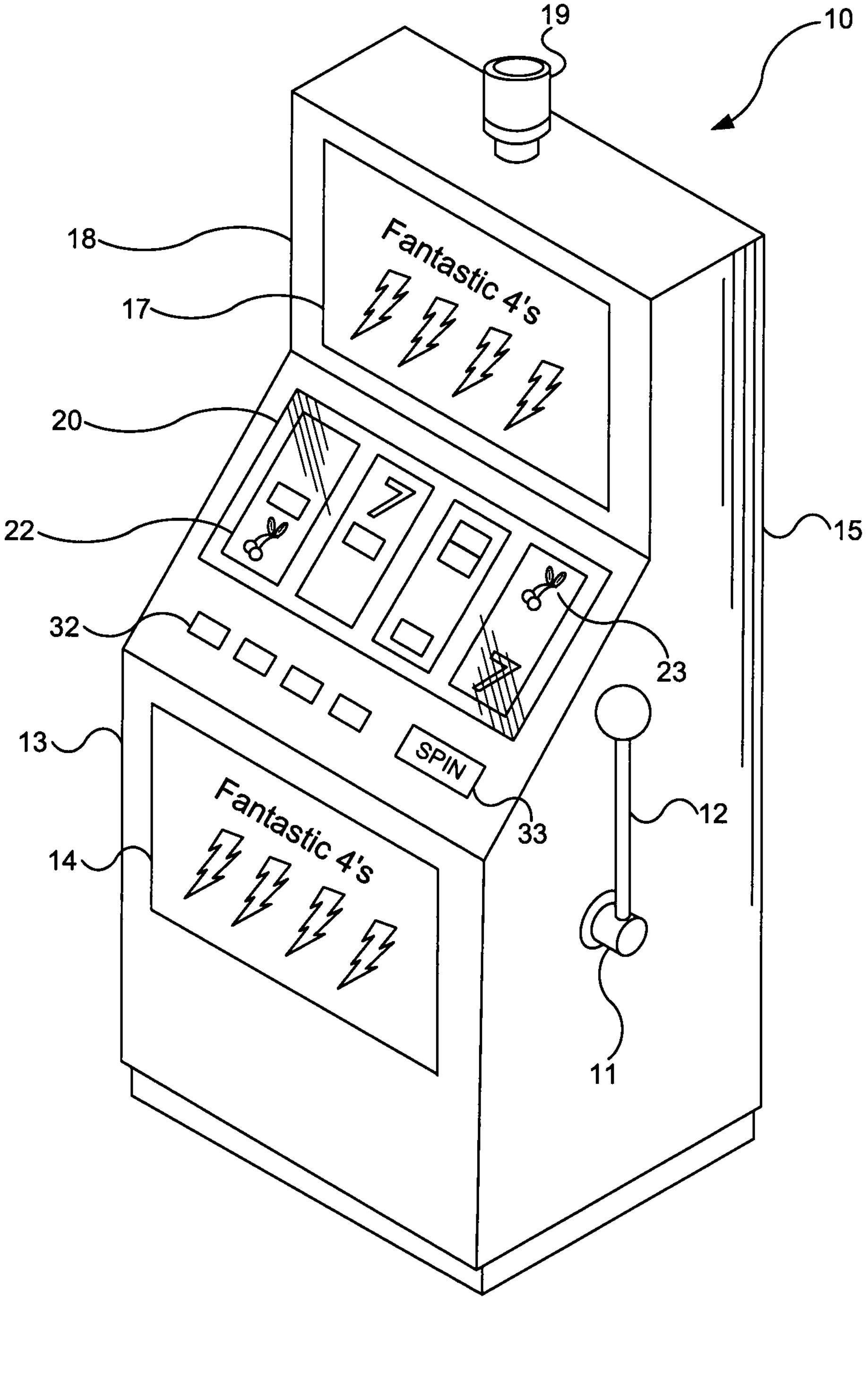
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cashout.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window." Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

A player typically plays the gaming device 10 by placing a wager and activating an input mechanism to initiate a game associated with the placed wager. As used herein, a gaming event refers to any activity that affects the calculation or display of a game outcome. Game events include interactions occurring between the gaming device 10, the player, and/or a connected game system. Example gaming events include a player inserting a player account card in a gaming device, a double-pay bonus time period activation, a first spinning reel coming to a stop, a player's input to hold a card in a poker hand, etc. A game refers to the calculation and completion of one game outcome. That is, a game includes a single game cycle that begins with the initiation of the wagered upon game and ends with the completion of all activities relating to the wager placed including any intervening bonuses. In other words, a game encompasses all gaming events dependent on a placed wager during an initiated game including all amounts due the player that are paid directly by the gaming machine, or as a manual payment by casino personnel to the player playing that gaming machine. For example, if an item was awarded as a result of a wager that could be saved and used later, the game would encompass the awarding of the item, which is part of the game outcome, but not the later use of that item since the later use would affect a different game outcome. A game session refers to one or more played games. For example, a game session for a particular player may include each game played on a specific gaming device, each game played between insertions of money or credits, each game played between an initial money or credit insertion and a cash-out or zeroing out of credits, each game played during a casino stay, or each game played over a predetermined time period. Alternatively, game sessions may refer to games played by multiple players over a specified time period or event period with respect to a particular gaming device or group of gaming devices.

The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The game may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a game.

If the game does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
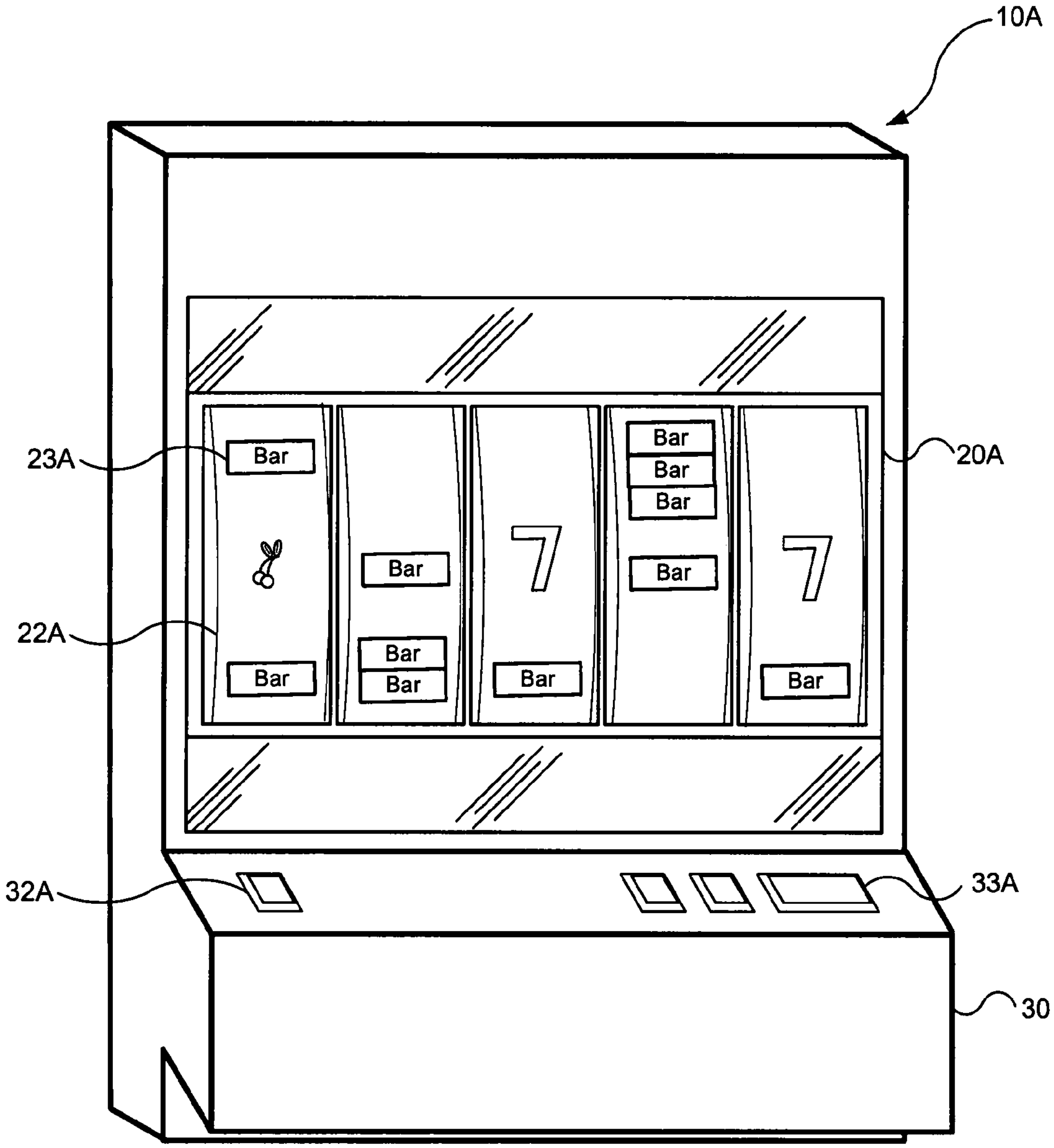
FIGS. 2A, 2B, and 2C are detail diagrams of exemplary types of gaming devices according to embodiments of the invention.
Figure 2B:
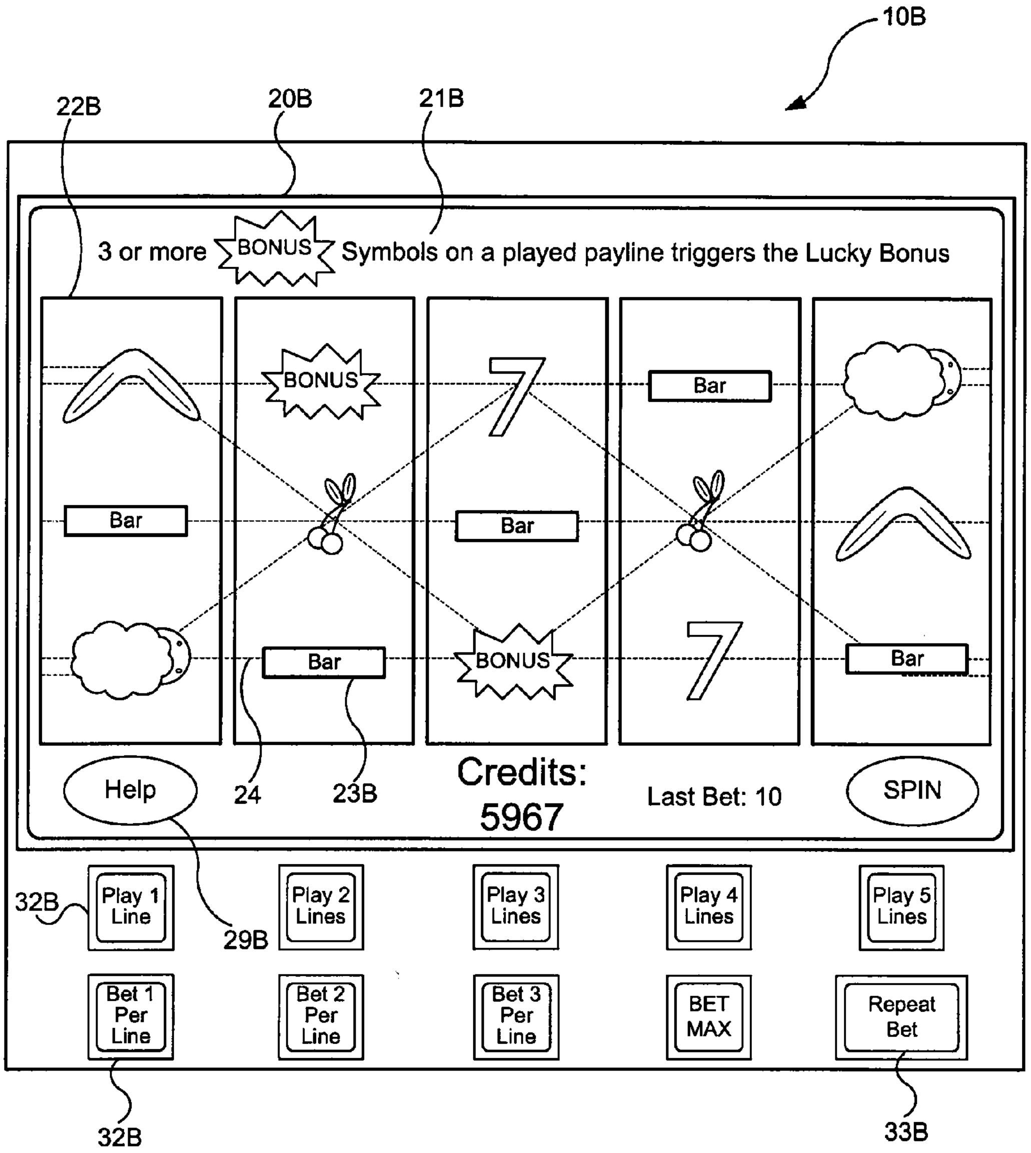
Figure 2C:
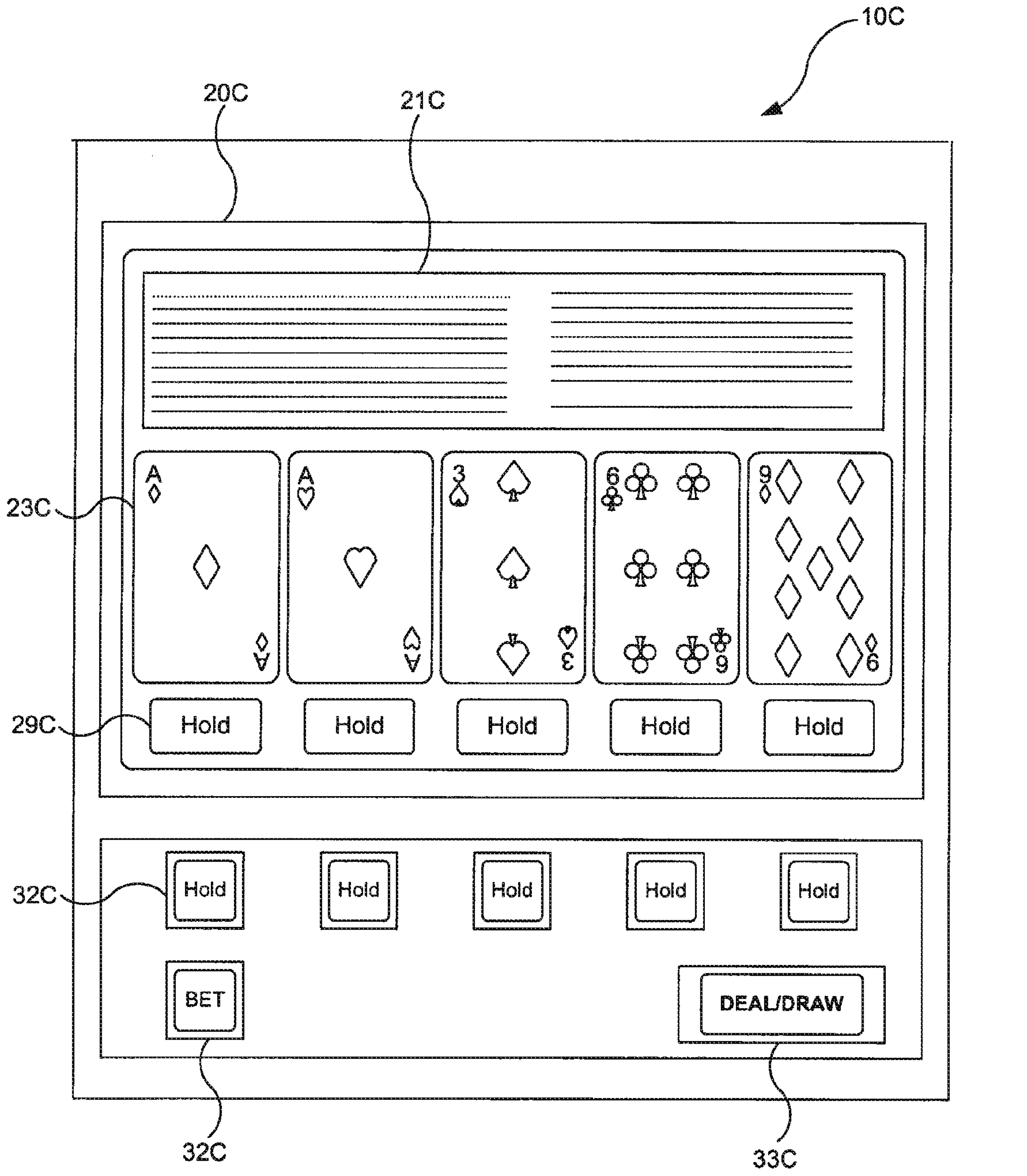

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A game on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touch-screen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the games. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the game ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five games, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a game. A repeat bet or spin button 33B may also be used to initiate each game when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a game after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
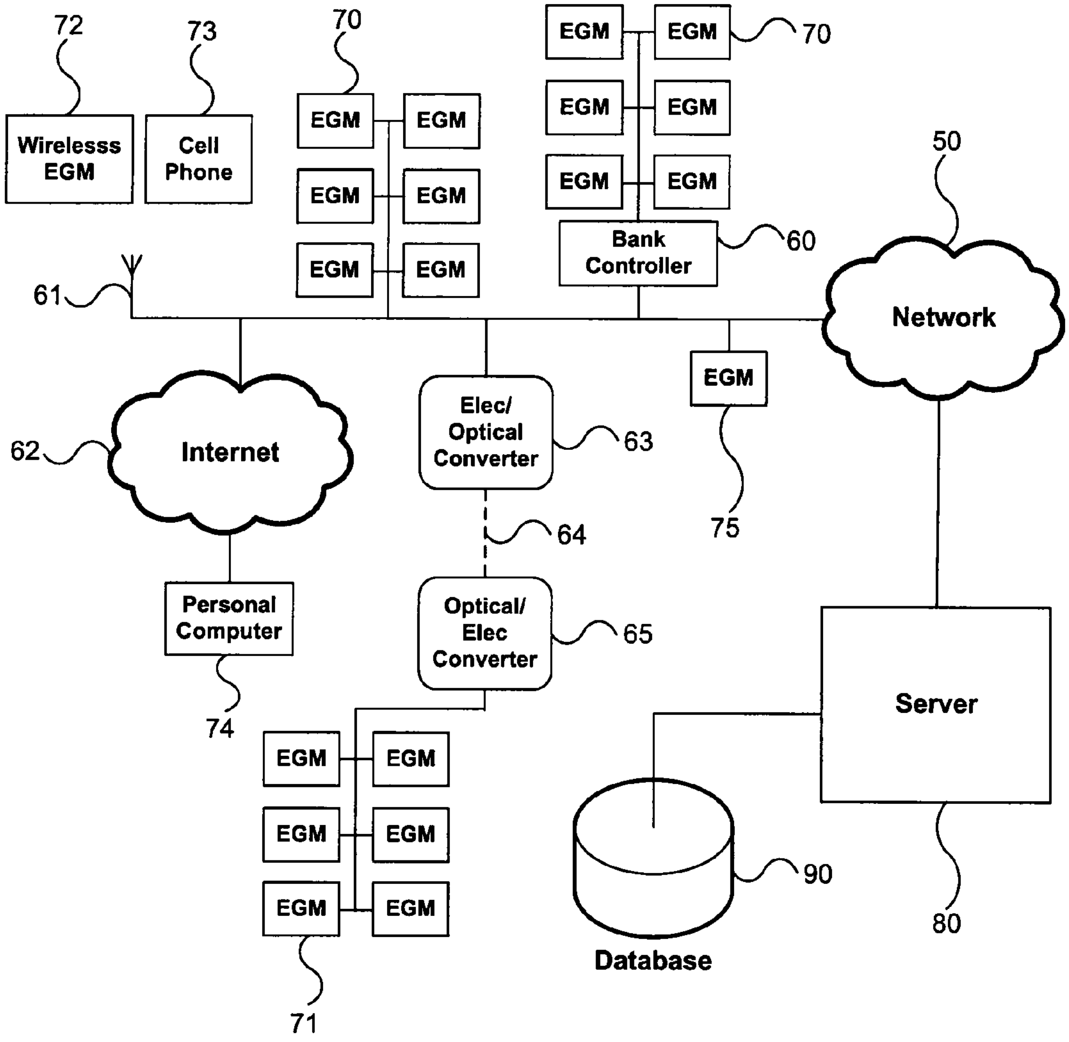
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Video poker games in casinos typically involve draw poker and simulate the play of a real deck. That is, a gaming device is programmed with a digital rendition of a deck of 52 standard playing cards. Upon making a wager, the game deals the player five cards face up (the "dealt poker hand"). The player may then discard any or all of the five cards and perform a "draw" operation to replace the discards with new ones from the remaining deck to form a "final poker hand."

The player's goal is to end up with specific card combinations after the draw is completed. Awards are paid if these specific card combinations are achieved according to the paytable of the video poker gaming device. Table A is a typical "Jacks or better" paytable, so called because a pair of any face cards or Aces (Jacks, Queens, Kings, or Aces) repays the wager amount. The award amounts shown in Table A are actually multiplier values used with the value of the original wager. For example, if $1.25 is wagered on a video poker game and a straight flush is struck, the initial bet is paid back at a 50:1 rate or 50 times the wagered amount, giving an award of $62.50.

TABLE A

| Hand | Award |
|---|---|
| Royal Flush | 800 |
| Straight Flush | 50 |
| 4 of a Kind | 25 |
| Full House | 9 |
| Flush | 6 |
| Straight | 4 |
| 3 of a Kind | 3 |
| 2 Pair | 2 |
| Jacks or Better (pair) | 1 |

If a "perfect" player (e.g., a player that always plays according to the best theoretical strategy) gambles on a machine with a paytable like that of Table A, the player will, over time, earn a return of about 99.54% of her total wagers. In other words, if the player gambles $1,000, on average she will win $995.40 in prizes. Of course most players do not always play according to the best theoretical average. This happens when the players are not aware of all of the best card-holding strategies, they are rushing through games and mistakenly hold the wrong cards before drawing, or they feel that a certain outcome is "due" or "lucky" and hold cards according to this feeling rather than according to the best theoretical strategy. Hence, the casinos overall hold percentage and profit from video poker gaming devices is often greater than the theoretical hold percentages. In the short term, players may win much more or much less than the theoretical payback percentage of the gaming machines due to the random nature of the game outcomes. This uncertainty is part of what makes gambling such a compelling past-time. However, when all player wins are averaged together over a relatively long period of time, the total payback percentage of a gaming device using the paytable illustrated in Table A will approach 99.54% or $995.40 for every $1,000 wagered.

Even if most players are not playing "perfectly," the hold percentage of the video poker gaming device will not be very large. If perfect play is again assumed, and presuming a standard rate of play of 600 hands per hour and a typical $1.25 average wager size, the casino earns only $1.25*600*0.46%=$3.75/hour. With less than perfect play, assume that the hold percentage increases to 1.5%, which means that the casino can earn up to $11.25 an hour. This earning number is still relatively low compared to most slot machines, which typically have a faster rate of play for games and much higher hold percentages.

Most casinos cannot justify placing a game on their floor with such a low profit potential and so they modify the paytable. For example, simply by lowering the award for a Full House from 9 to 8 and lowering the award for a Flush from 6 to 5, the minimum house advantage or hold percentage increases from 0.46% to 2.7%, which is over a fivefold increase. Some popular casinos may modify the paytable even further to further increase their profits. Because video poker games typically use a traditional 52 card deck, casinos are generally limited in fluctuating hold percentages by implementing different paytables instead of changing some other aspect of the game play. Thus, unlike slot machines, where players do not generally know what hold percentage the game is set to, players can determine the hold percentage of video poker games from an understanding of the rules and paytable. Even if most players do not calculate out the exact theoretical hold percentage of video poker gaming device, these players typically understand that a 9/6 paytable is more favorable than an 8/5 paytable and are hence more reluctant to play an 8/5 paytable or worse and seek out games with 9/6 paytables.

In most video poker games, a large percentage of total wins are paid by the very low awards. For example, in a jacks or better video poker game, most of the awards include card combinations of pairs with jacks or better, or two pairs. Because these awards are very low, money back on jacks or better and double money on two pair, these hands are sometimes considered boring to play, but essential to winning maximum return.

Embodiments of this concept address these issues by providing a video poker gaming device that utilizes rapid play so that a high paying (low hold percentage) paytable can be utilized while emphasizing larger wins and increasing profits for the casino. Although, a standard game of jacks or better video poker is illustrated in Table A and discussed in the embodiments below, one of skill in the art will readily appreciate other embodiments of this concept can be used with any paytable or any other draw poker game such as "Deuces Wild" "Bonus Poker" or any other draw poker configurations.

Figure 4:
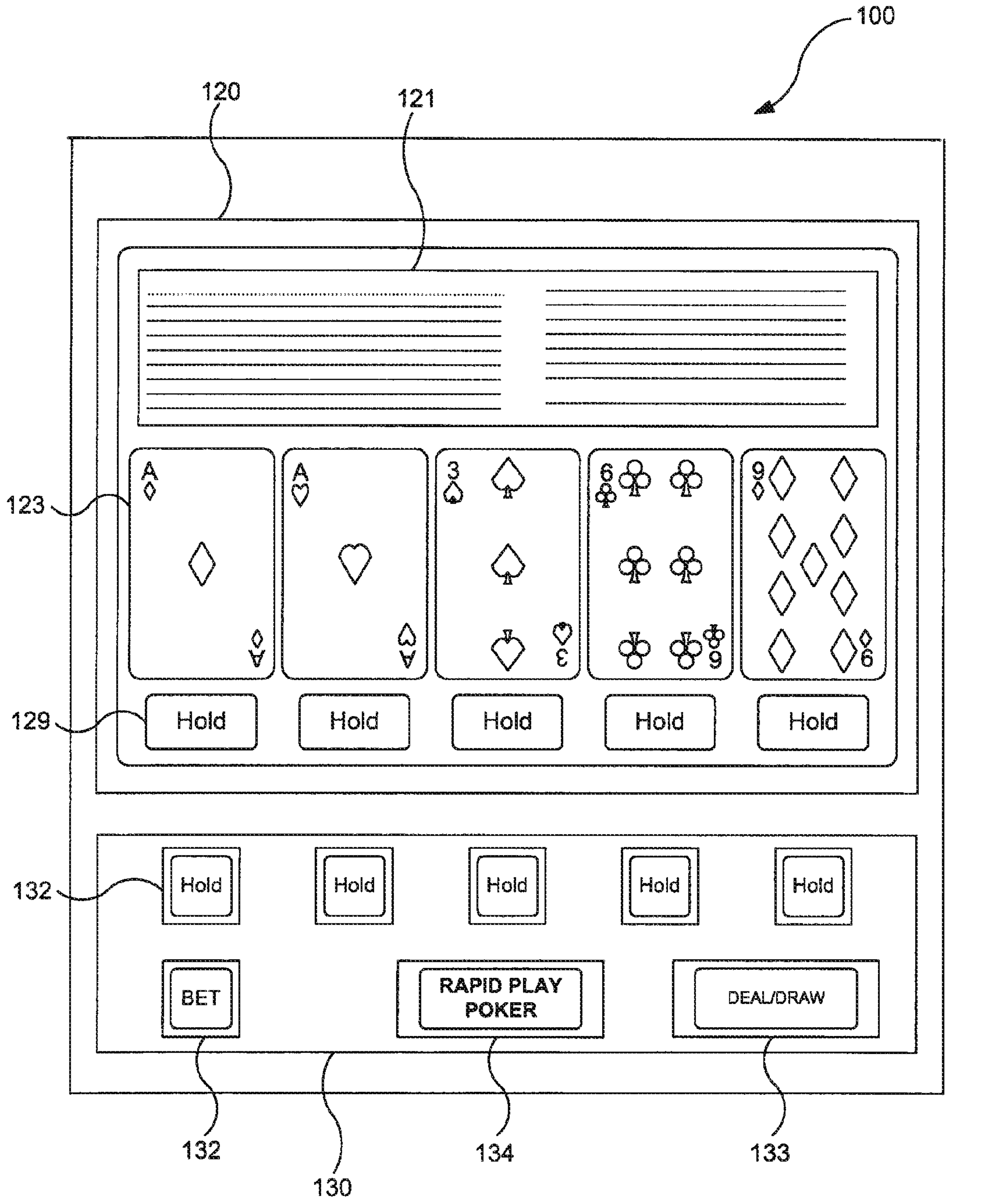
FIG. 4 is a detail diagram of a video poker gaming device according to embodiments of the invention.

FIG. 4 is a detail diagram of a video poker gaming device according to embodiments of the invention.

Referring to FIG. 4, the gaming device 100 includes a video display 120 that displays player information 121, a plurality of playing cards 123, and a plurality of soft buttons 129 associated with each playing card 123. The gaming device 100 may also include a player interface panel 130 that includes a plurality of game buttons 132, a 'Deal/Draw' button, and a 'Rapid Play Poker' button 134. The rapid play poker button 134 may utilize concepts discussed in co-pending U.S. patent application Ser. No. 12/204,633, filed Sep. 4, 2008, entitled GAMING DEVICE HAVING VARIABLE SPEED OF PLAY (herein referred to as "the '633 application"), which is hereby incorporated herein by reference. That is, the rapid play poker button 134 may vary the speed of game play for the video poker gaming device 100 to emphasize larger winning hands. Operation of the video poker gaming device 100 using the rapid play poker button 134 will be further described below.

In operation, the player of gaming device 100 is dealt five cards. An additional five cards are selected and held in secret. These cards are the replacement or "draw" cards, which are substituted for any of the initial deal cards the player chooses to discard. In some embodiments, the additional five cards are ordered in that first selected draw card is used to replace the card of the first (leftmost) discarded position; the second draw card replaces the next discarded position, etc. Of course, if only one card is discarded, only the first draw or secret card is used and the others are never played as part of the game. In other embodiments of this invention cards may be ordered in any manner, or a player may choose which of the cards is substituted for each discard.

Once the five dealt cards (visible to the player) and the five hidden draw cards are selected and held secret from the player, the gaming device 100 inspects all ten cards to determine if a combination of the ten cards meets a predefined criterion. In some embodiments, the gaming device 100 determines if any winning card combinations are possible from the ten cards using a best theoretical strategy (perfect play). Here, the predefined criterion is any win; that is, any card combination associated with an award. To accomplish this determination, the gaming device 100 may analyze or evaluate the possible card combinations arising from holding and drawing cards using at least the best theoretical strategy and determining if any potential awards are associated with these card combinations. In some embodiments, the gaming device may make the analysis of which cards to hold and draw using more than one strategy. For example, a strategy that emphasizes holding all dealt face cards may also be used when analyzing possible card combinations since some newer players tend to hold a lot of face cards in the hope of receiving a pair of jacks or better.

As games are typically implemented with fast microcomputers, this evaluation is accomplished in a very brief time—perhaps a few milliseconds or less. In the above example, if the evaluation shows that no win is possible (or only wins below a predefined criterion or designated threshold), the gaming device will display a non-preferred game sequence. This non-preferred game sequence may include displaying the dealt cards for a relatively short amount of time and then automatically discarding some or all of the dealt cards and displaying a final hand. In some embodiments another poker game may be automatically initiated as described in the '633 application following the non-preferred game sequence.

In other embodiments, the non-preferred game sequence may include displaying the dealt hand and revealing the draw cards above the dealt hand. In still other embodiments, the non-preferred game sequence may include simply deducing the wager from the credit meter of the gaming device. Here, no cards are displayed to the player during the non-preferred game sequence. In embodiments where the predefined criterion is a minimum threshold award value over a certain number, analyses of card combinations that form winning hands with an award less than the minimum threshold value may have a non-preferred game sequence of displaying the dealt hand, automatically holding cards according to the best theoretical strategy or other strategy being used, and automatically drawing cards so as to display a final hand with the winning card combination. The gaming device 100 may also show the award value briefly and roll up the credit meter with the awarded credits. As discussed above, a second poker game may automatically be initiated as soon as the non-preferred game sequence is displayed.

As discussed in the embodiments above, the analysis of the possible card combinations may use one or more predefined strategies with the knowledge of all possible cards for that game, i.e., the dealt cards and the secret draw cards. However, in other embodiments, different algorithms may be used: for example, analysis could be made with full or partial evaluation of the hidden deal cards. As one of skill in the art will appreciate, any algorithm for evaluating the possible card hands is useful with this concept. With any of these algorithms, when the analysis determines that the card combinations do not satisfy the predefined criterion, the entire poker game may be played much faster than a conventional video poker game. In embodiments that utilize an automated deal and draw of a poker hand, entire poker game takes only 0.25 seconds, though the process can operate more quickly or more slowly in other embodiments.

If, on the other hand, the analysis determines that a card combination satisfies the predetermined criterion, the gaming device 100 displays the dealt poker hand and allows the player to choose which cards to hold and which ones to discard. Once the player makes her hold selection, the discarded cards are replaced with the hidden draw cards in the designated order. If a win results, the player is paid according to the paytable of the game, such as the one shown in Table A. In some embodiments, a second poker game may again be automatically initiated following the display of the final hand and presentation of the credit award as described in the '633 application. In other embodiments, the gaming device 100 may wait for further player input after displaying the final poker hand and presenting the awarded credits.

As a result of the just-described process, games which result in losses or small wins are played very quickly. Only games with potential wins equal to, or above, the designated threshold specified by the predefined criterion are played by players and this play occurs at normal speed. Because losses and small wins are a very large portion of all game outcomes, however, overall game speed is significantly increased and players are not burdened with playing out hands with small or no win possibilities.

In the just-described process player are only presented with games to play that have a chance at having a winning outcome that meets the predefined criterion. However, this does not mean the player will necessarily win because the player still must make decisions as to which cards to hold and discard. Thus, depending on the choices made, the player may still lose or not win the maximum possible amount. In other embodiments, however, the player may be given at least partial information about the possible wins available. For example, the game could inform the player that a maximum win of Four of a Kind is possible. Or the player could be informed that the lowest winning combination is Three of a Kind. In other words, the player could be told of the maximum or minimum winning possibilities. In another embodiment, the player could be told of all the possible winning combinations or a subset of the possible winning combinations. In yet another embodiment, the player could be shown one or more cards in the draw pool. Such disclosures may be used to heighten the entertainment value of a game, but that information can also improve the likelihood that the player will achieve a final poker hand with at least one of the card combinations associated with an award greater than the predefined threshold amount.

One of skill in the art of draw poker design will understand that these "tips" or extra game information increases the odds of winning and hence will alter the theoretical payback percentage of the gaming device. To offset this increase, the paytable values may be changed or another aspect of the game may be altered. All techniques relating to the varied embodiments disclosed herein and all of the possible combinations thereof are within the scope of this inventive concept.

In another embodiment, disclosure of possible outcomes or the identity of one or more draw cards can be offered for an additional wager, whether of cash, player loyalty points, or other consideration. In another embodiment disclosure of possible outcomes may reduce the award value of the paytable for that game. In yet another embodiment, such disclosure may vary by time of day, day of week, initial wager size, player identity, total play by the player and other parameters, either alone or in any combination. Further, disclosure may be made automatically or only when selected by the player.

In another embodiment of the invention, the gaming device may offer players the opportunity to play games when the analysis determines that a certain possibility of winning or simply an estimated probability of winning is above a predefined threshold amount. Similarly, this determination may be made by evaluating one or more of the dealt cards, one or more of the draw cards, or any combination thereof.

In another embodiment of the invention, hands presented to the player for play may include a "buy-out" offer in return for the player surrendering his hand and its potential win. For example, the player may be offered a flat payment of 5× his wager to surrender his cards. As another example, the buyout amount could vary, either randomly or in proportion to the value of the potential win, or in proportion to any other variable, such as player identity, etc. The buy-out offer may be made prior to dealing the first set of cards or may be made after the dealt hand is displayed to the player. These buy-out offers may increase the speed of the game and provide another level of intrigue for seasoned video poker players. The buy-out offer feature may also be opted-out of by players that would rather play a more traditional poker game. In some embodiments, if the player chooses to accept the buy-out offer, the deal and/or draw cards may be displayed to the player to show them what they would have received had they not accepted the offer. A best final hand may also be highlighted from the revealed cards or otherwise displayed.

By implementing embodiments of this concept, player enjoyment may increase since game play is focused on winning or otherwise positive poker hands while losing hands and small win hands do not have to be played. In addition, the speed of game play can be greatly increased because games with losing hands and hands with small wins are completed at a much faster rate through the non-preferred game sequences.

For example, if only games with possible wins of Three of a Kind or better are offered to players, the player will only be offered one game out of every approximately 7 hands played. If each losing or small win game requires ¼ second of time, and the one game offered to the player requires 6 seconds of time, the average game time is (6*0.25+6)/7=1.07 seconds per game; nearly 6 times faster than the 6 seconds per hand of traditional video draw poker.

Because game play is 6 times faster, the casino makes more money per hour on a given hold percentage. For example, the 6/9 draw poker, which is desirable from a player perspective, can now earn about 6 times as much per hour of player wagering. That is, instead of earning about $3.75 per hour, the casino earns an amount closer to $22.50/hour. Since overall game speed is partially determined by how quickly the player starts each subsequent game, even faster game play can be accomplished by utilizing embodiments where a second or subsequent poker game is initiated immediately following the completion of the prior game for so long as credits remain to fund play. As described in the '633 application, the wager size of the prior game may be repeated in each subsequent game. The player may be able to pause or stop this automated play at any time by pressing a designated button.

In other embodiments a delay is placed after each automatically completed game before the next game starts, and another delay, equal or different to the first delay period, is placed after each player-completed game before the next game is restarted. In some of these embodiments the amount of the delay varies according to the prior game outcome. For example, the delay time depends upon the amount won. Here, the delay time may correspond to the time it takes to roll up the awarded credits on the credit meter.

In other embodiments, a new game is initiated almost instantly after completion of each losing or small win hand that is played by the game itself, but is not initiated following a player-completed game. As described in the '633 application, this win seeking embodiment allows player to quickly move through losing and low paying games while being able to savor the higher paying games. Here, the player must restart game play after playing a potentially larger winning poker game by pressing a designated button, such as the rapid player poker button 134 or the deal/draw button 133.

In another embodiment, the player is provided the ability to select between playing a standard video poker game, that is a poker game in which no games are automatically played, and the rapid play poker mode. Referring again to FIG. 4, the player may use the rapid player poker button 134 to initiate one or more rapid play poker games and may use the deal/draw button 133 to initiate a conventional video poker game. In other embodiments, the player may activate a switch or make a selection in a game menu to change between poker game modes.

In another embodiment, the player may select the award level of wins used as the threshold value for the predefined criteria in determining which poker games are to be automatically played. In another embodiment, the player may choose how quickly each automatically played game is completed, and/or how long the delay is between the time one game is completed and the next game begins. In order to incentivize the player to play rapidly, the paytable could vary according to how fast the games are played. For example, poker games initiated using the rapid play poker button 134 may utilize a higher paying paytable (e.g., a 6/9 paytable for jacks or better poker) than a paytable used for a poker game initiated using the single game deal/draw button 133 (e.g., a 5/8 paytable for jacks or better poker). Additionally, higher paying paytables may be used when the player selects a minimal inserted delay between games. Further, higher awards may be available when a longer series of games is played in rapid play poker mode. These awards may be progressive in nature such that they increase the longer rapid play poker is used and are reset if a conventional poker mode is used, or the player leaves the gaming device 100.

Figure 5:
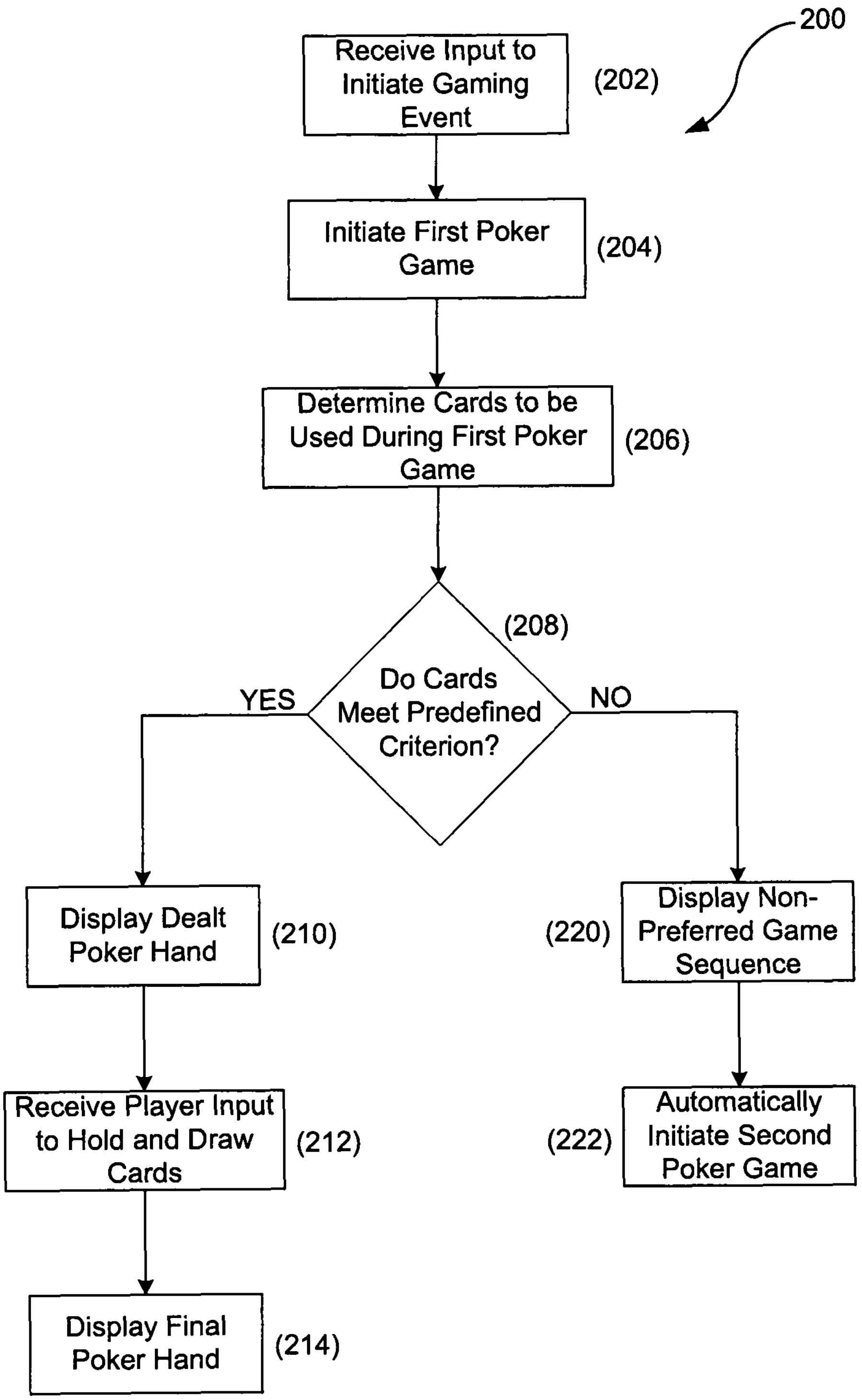
FIG. 5 is a flow diagram of a method of operating a video poker gaming device according to embodiments of the invention.

FIG. 5 is a flow diagram of a method of operating a video poker gaming device according to embodiments of the invention.

Referring to FIG. 5, flow 200 begins by receiving an input to initiate a video poker game in process (202). This received input may include receiving a specified amount of credits for wagering on the poker game and receiving an input signaling that the player is ready to place the specified wager on a video poker game. In process (204), a first poker game is initiated. The first poker game may be initiated by accepting the wagered credits and selecting five cards as part of a dealt hand and five cards as possible draw cards. The gaming device then determines which cards have been selected in process (206) and analyzes the cards using one or more predefined strategies to evaluate whether the cards include a combination that meets a predefined criterion in process (208). If the cards do not include a combination that meets the predefined criterion using one of the strategies, the gaming device displays a non-preferred game sequence in process (220). In some embodiments, the gaming device may also automatically initiate a second poker game in process (222) after displaying the non-preferred game sequence.

If the gaming device does determine that a combination of the selected cards meets the predefined criterion in process (208), the gaming device displays the first five selected cards as the dealt poker hand in process (210). At this point, the player is allowed to hold any of the dealt cards if desired and to draw additional cards from the secret draw cards to replace any cards that are not held in the dealt hand in process (212). The draw cards, if any, replace the discarded cards after the draw and a final poker hand is displayed to the player in process (214). If the player has won an award associated with the final poker hand, the player may also receive the award in conjunction with the display of the final poker hand.

Although flow 200 specifies that all of the cards are selected and analyzed prior to displaying anything to a player, other embodiments include different orders of these steps. For example, other embodiments of the invention provide for dealing the first five selected cards as a dealt poker hand before selecting the draw cards and analyzing the dealt and draw cards to determine if these sets of cards include an combination that meets the predefined criterion.

FIGS. 6A, 6B, 6C, and 6D are detail diagrams of a video poker gaming device during various stages of a game according to embodiments of the invention.

Figure 6A:
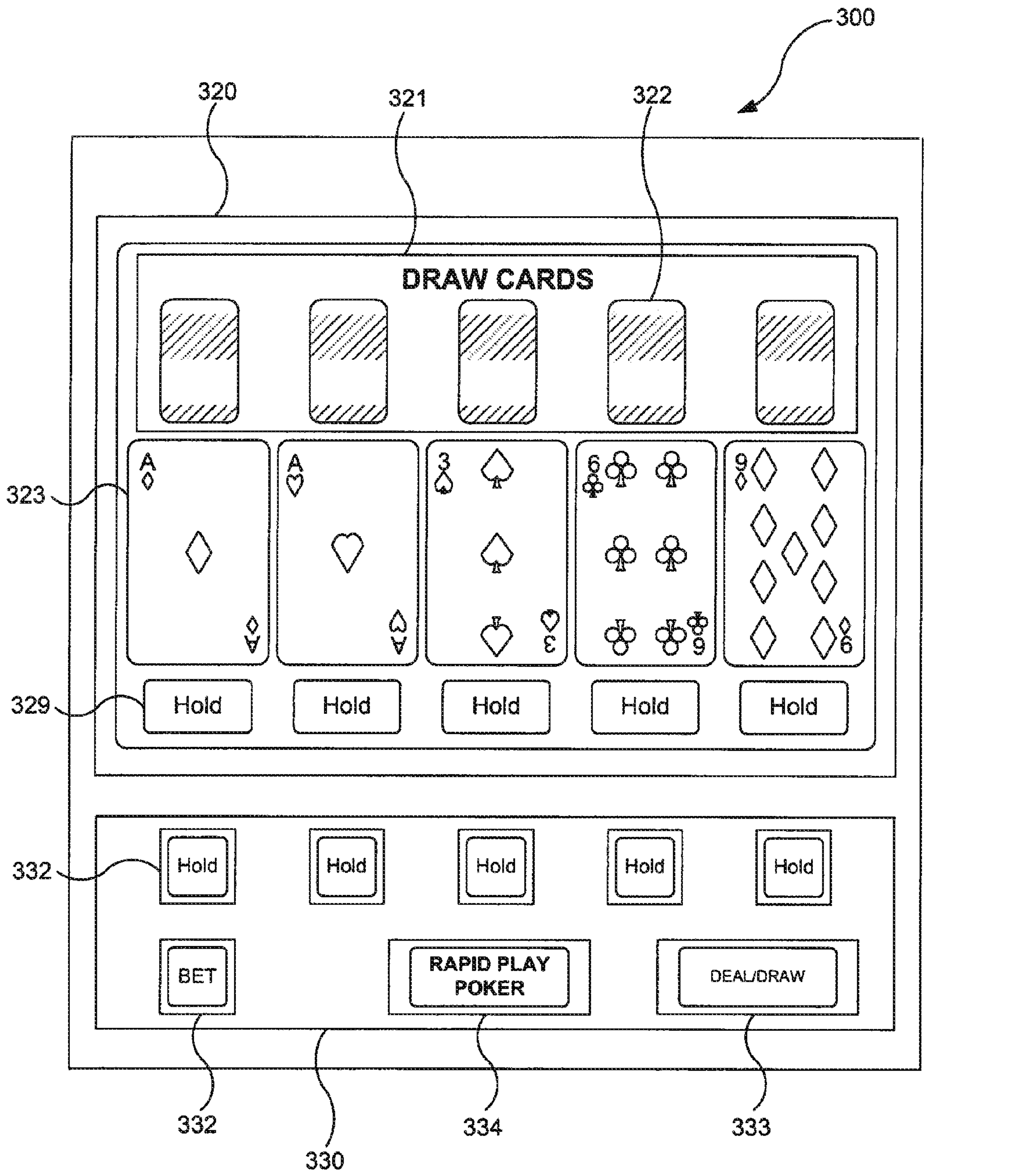
FIGS. 6A, 6B, 6C, and 6D are detail diagrams of a video poker gaming device during various stages of a game according to embodiments of the invention.

Referring to FIG. 6A, a video poker gaming device 300 includes a video display 320 and a player interface panel 330 having multiple game buttons 332, a "Deal/Draw" button 333, and a "Rapid Play Poker" button 334. The buttons on the player interface panel 330 may operate in a similar way to the buttons described above for the player interface panel 130 of FIG. 4. The video display 320 includes a display of five dealt cards 323 and five soft buttons 329 corresponding to the displayed cards 323. In addition, the video display 320 includes a draw display 321 showing the five possible draw cards 322. When discarding certain cards in the dealt poker hand and drawing from these displayed, but unrevealed draw cards, to complete a final poker hand there are many ways to display the selected draw cards. For example, the draw cards directly above the discarded cards may be drawn (revealed) and slide into the spot vacated by the corresponding discarded card. This does not necessarily mean that the draw cards correspond to the cards below. Rather, this may be done simply for show. In other embodiments, the draw cards may be revealed from the left or the right and sequentially fill the spots vacated by the discarded cards from the dealt poker hand.

In other embodiments, the player may select which of the displayed draw cards 322 they would like to reveal. That is the player may select which ones among the unrevealed draw cards they would like to complete their final poker hand. In some of these embodiments, the identify of each unrevealed draw card is assigned prior to allowing the player to select among the draw cards 322. In these scenarios, the player's selections will have an impact on the final poker hand. In other ones of these embodiments, the cards will be sequentially revealed according to a predetermined script. That is, no matter which draw card the player selects first, it will be identified according to the first card of the predetermined script sequence.

Figure 6B:
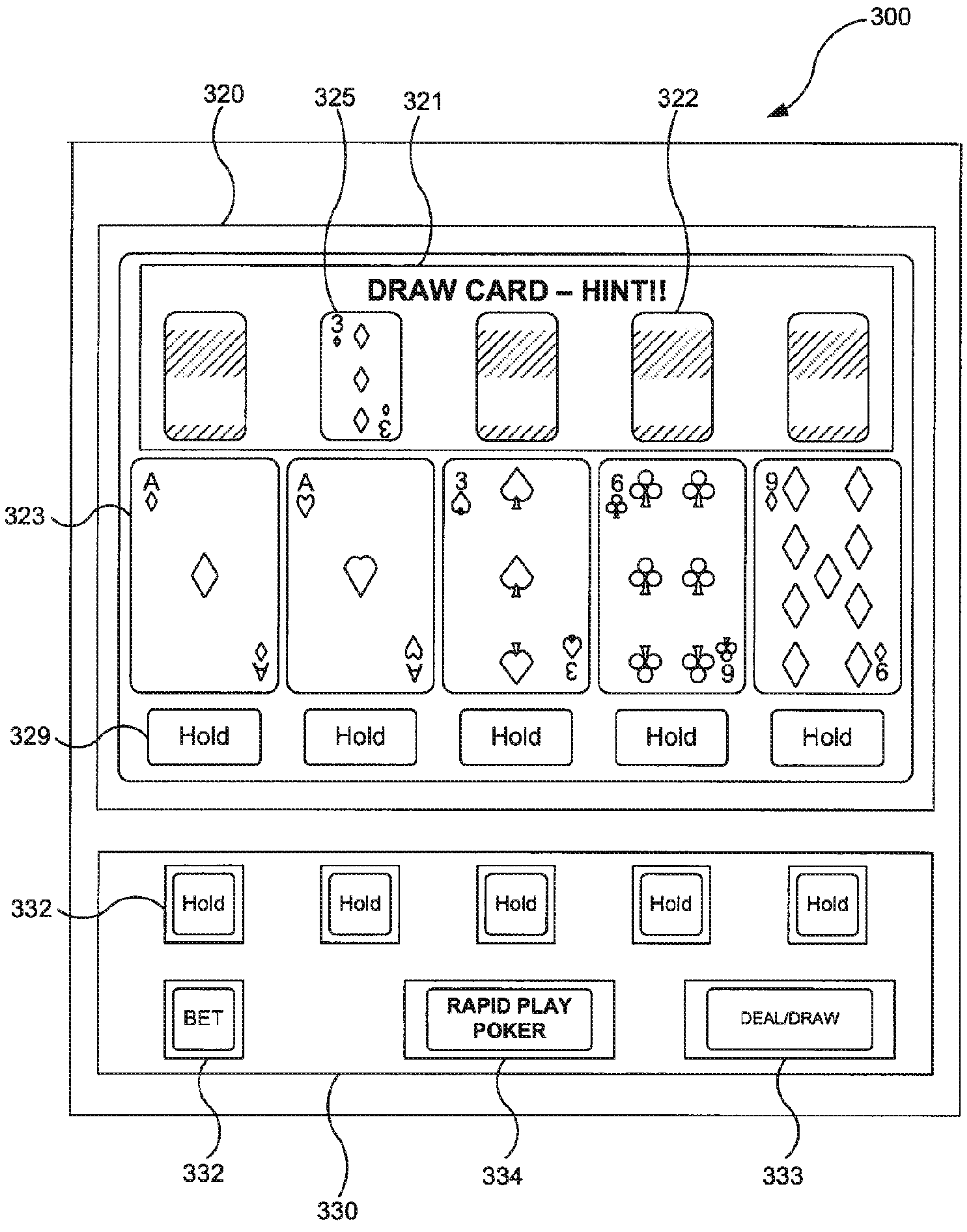

Referring to FIG. 6B, the gaming device 300 has provided the player with a "tip" or "hint" with regard to the possible outcomes and/or identify of the draw cards. In this embodiment, the gaming device 300 has shown the player the identify of one of the draw cards 325, which in this case is a three of diamonds. In addition to letting the player know the identify of one of the draw cards, the gaming device 300 is also giving the player a hint of one of the possible higher paying outcomes for the final poker hand. This will be seen in the next figure, FIG. 6C.

Figure 6C:
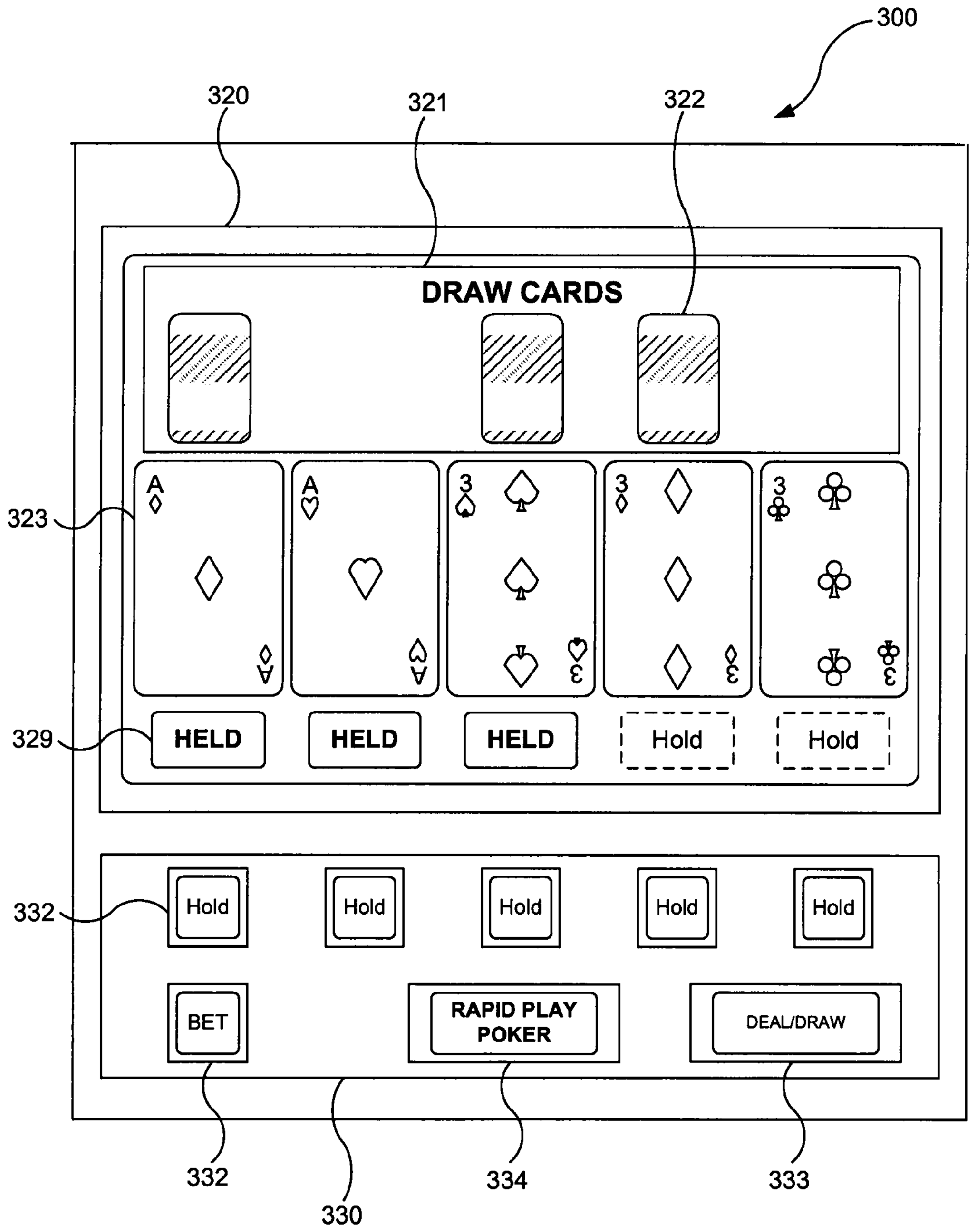

Referring now to FIG. 6C, the player has activated the soft buttons 329 corresponding to the ace of diamonds, ace of hearts, and 3 of spades to hold these cards from the dealt poker hand. The player has also pressed the deal/draw button 333 to discard the other two cards from the dealt poker hand and selected the two draw cards 322 from the draw display 321 to replace these two discarded cards. Here, the player has chosen to take the revealed draw card 325 (the three of diamonds) and selected the fifth draw card 322 as the other card to complete the final poker hand. This fifth draw card 322 turns out to be the three of clubs, which gives the player a full house of threes over aces. On a 9/6 paytable, such as the one shown above in Table A, the player would receive nine times their wager for this full house card combination.

As noted above, the revealed draw card may have changed the player's strategy in holding cards from the dealt hand. That is, without knowing that one of the draw cards 322 was another suited 3 card, the player may have elected to only hold the two aces and drawn three cards from the draw cards 322. Thus, by revealing one of the draw cards 322, the gaming device is not only giving away information about the identity of one of the draw cards, but is also telling the player one of the possible winning card combinations (here, two pairs).

In some embodiments, the player may choose one of the draw cards 322 to be revealed in a tip or hint. In other embodiments, the gaming device 300 may automatically choose one of the draw cards 322 to reveal. The gaming device 300 may make this choice randomly or may take into account the possible card combinations when deciding which of the draw cards 322 to reveal. As discussed above, this reveal may be done in response to an additional payment by the player, in response to a game event, or just randomly during a game session.

Figure 6D:
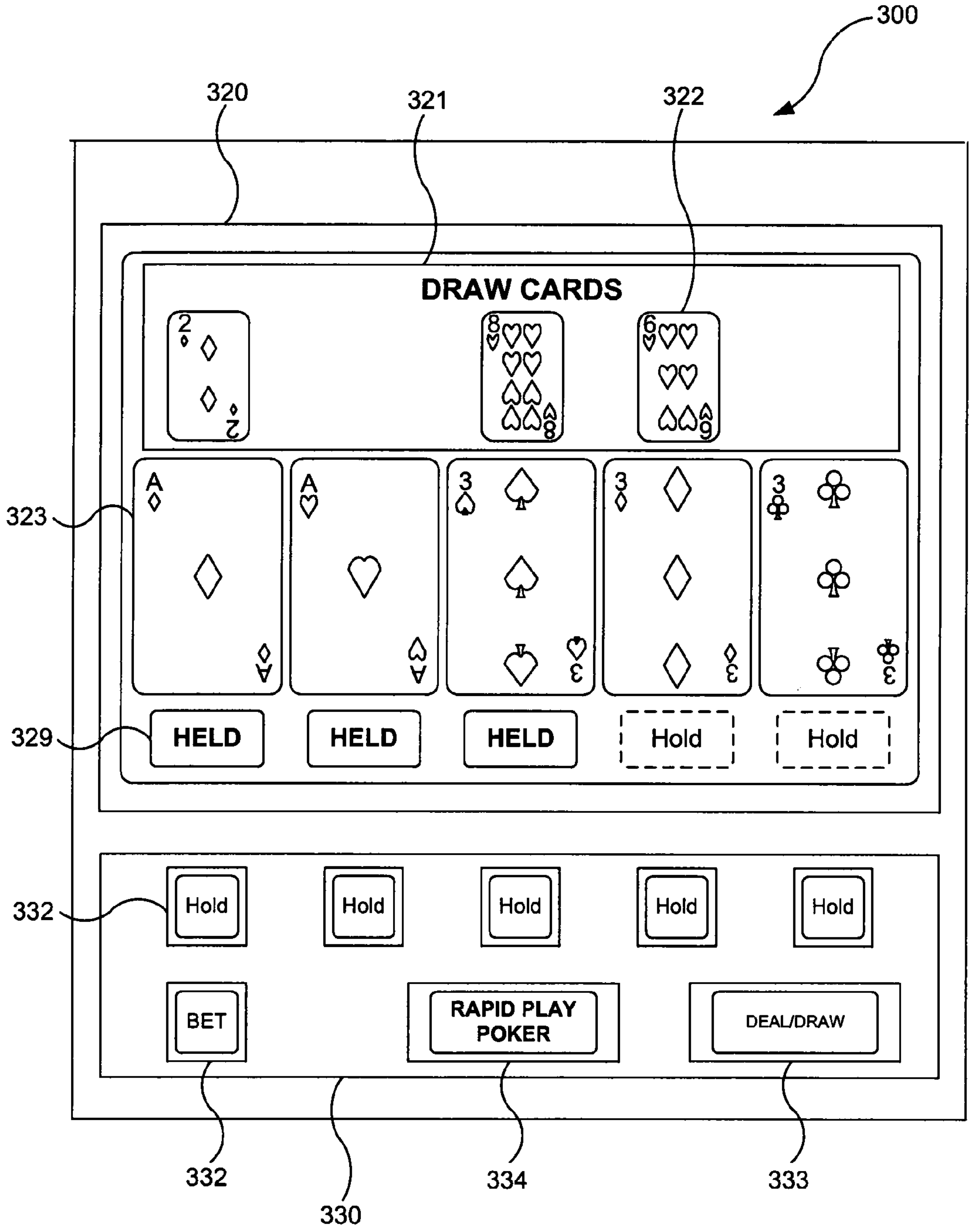

Referring to FIG. 6D, after showing the final poker hand made up of the held cards and selected draw cards, the gaming device 300 may reveal the other non-selected draw cards 322 in the draw display 321 to let the player know what other possible cards were available. Although FIGS. 6A-6D illustrate providing the player with a tip or hint according to some of the embodiments of the invention, the gaming device 300 may be modified to accommodate other ones of the embodiments discussed above.

Figure 7:
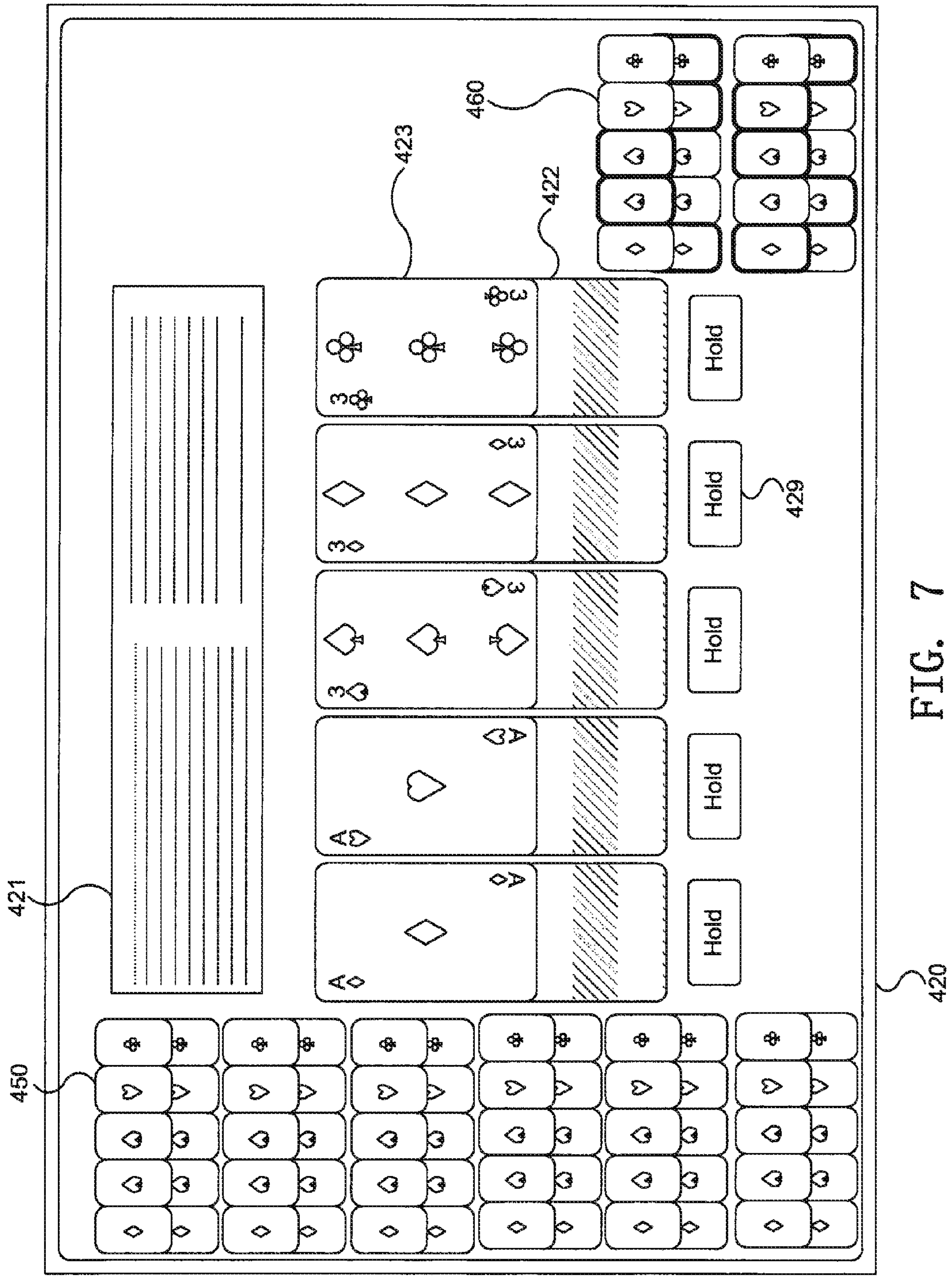
FIG. 7 is a detail diagram of a display of a video poker gaming device according to embodiments of the invention.

FIG. 7 is a detail diagram of a display of a video poker gaming device according to embodiments of the invention.

Referring to FIG. 7, a video poker display 420 includes a game play area having a plurality of dealt cards 423 and a plurality of draw cards 422. The video poker display 420 also includes a plurality of soft buttons 429 associated with the cards in the game area and a game information area 421 that shows game information such as paytable data. Also included in the video poker display 420 is a historical losing hand display 450 showing recent losing hands and a historical winning hand display 460 showing recent winning hands.

In operation, games that result in losing poker hands have the hands transferred to the historical losing hand display 450. For example, a game that results in a losing hand may have the losing hand transferred to the bottom of the historical losing hand display 450 thereby shifting each of the other losing hands shown in the historical losing hand display 450 up and eliminating the topmost displayed losing hand if it has neared the top of the display 420. Similarly, games that result in winning poker hands have the hands transferred to the historical winning hand display 460.

In some embodiments where the game device analyzes whether the dealt cards and the draw cards result in a possible winning hand or otherwise meets a predefined criterion, the dealt cards may be briefly displayed to the player, the draw cards are revealed, the losing hand is automatically transferred to the historical losing hand display 450, and a subsequent game is initiated. In the same embodiments, the game device may display the dealt cards and allow the player to hold and draw cards when the analysis determines that the dealt cards and draw cards can result in a winning hand or otherwise meets a predefined criterion. If the player chooses to hold and draw cards such that the resulting final poker hand is a winning poker hand, the poker hand is transferred to the historical winning hand display 460 and the gaming device waits for the player to initiate a subsequent game. Here, the player only plays hands that have a chance of being winning hands (or otherwise meeting a predefined criterion) and the player is able to observe the recent winning and losing hands.

In alternate embodiments, the gaming device may continue to briefly display losing hands until an advance game information analysis indicates that a hand is a possible winning hand or a predefined event occurs. Here, the predefined event includes a particular number of games passing without the player playing a hand. That is, if a player only plays hands that have a potential winning outcome, the player may try to second guess themselves when finally being allowed to play a hand. For example, a player may receive a draw of three spades and a pair of threes. Normally, the player playing the best possible strategy would hold the pair of threes in the hopes of receiving a third three or another pair of cards. However, the player may remember past games where when confronted with a similar situation, the possible winning hand used a strategy of holding the three matching suit cards or even holding a lone eight card that was included in a winning straight. This possible conundrum occurs when the analysis only indicates that a winning hand is possible. The winning hand may be reached using a best theoretical strategy or it may have nothing to do with the best theoretical strategy. If a player uses the best theoretical strategy, but does not receive a winning hand when they do get a chance to play, they may second guess their strategy and just go for the larger win. Thus, in the above example, the player may hold the three spade cards and hope for a higher paying flush.

These embodiments, however, also pause the automatic re-initiation of games to allow the player to play hand based on predefined events. These predefined events may include a predefined or random number of losing games occurring, a predefined amount of time passing, or other metrics. Here, the player may not be sure whether the game has allowed them to play a hand because it is a possible winning hand or because the predefined event paused game play to allow player interaction. This may make the game more interesting while still allowing for a faster rate of overall game play speed. In other embodiments, as described in the '633 application, the player may pause the re-initiation of games at any time by pressing a game button or a separate pause button.

In yet another embodiment, the gaming device may analyze the dealt and draw cards to determine if a winning hand is possible, discarding the cards completely if they do not result in a possible winning hand, and continuing to analyze new sets of dealt and draw cards until a possible winning hand is found among the analyzed cards before ever showing the dealt cards to the player. In essence, these embodiments allow a player to play only hands that have one or more possible winning card combinations. Since the player does not have to wager on each of the discarded hands the game paytable must be adjusted to maintain a proper hold percentage for the casino. This can be accomplished in a variety of ways. For example, the award values of the winning hands may be reduced or the player may have to wager more to enjoy the standard paytable amount. For example, a player may have to place a wager of five credits to enjoy the 9/6 paytable shown above in Table A. Here, a hand that results in a pair of face cards or aces will only "win" one credit on a five credit wager.

Figure 8:
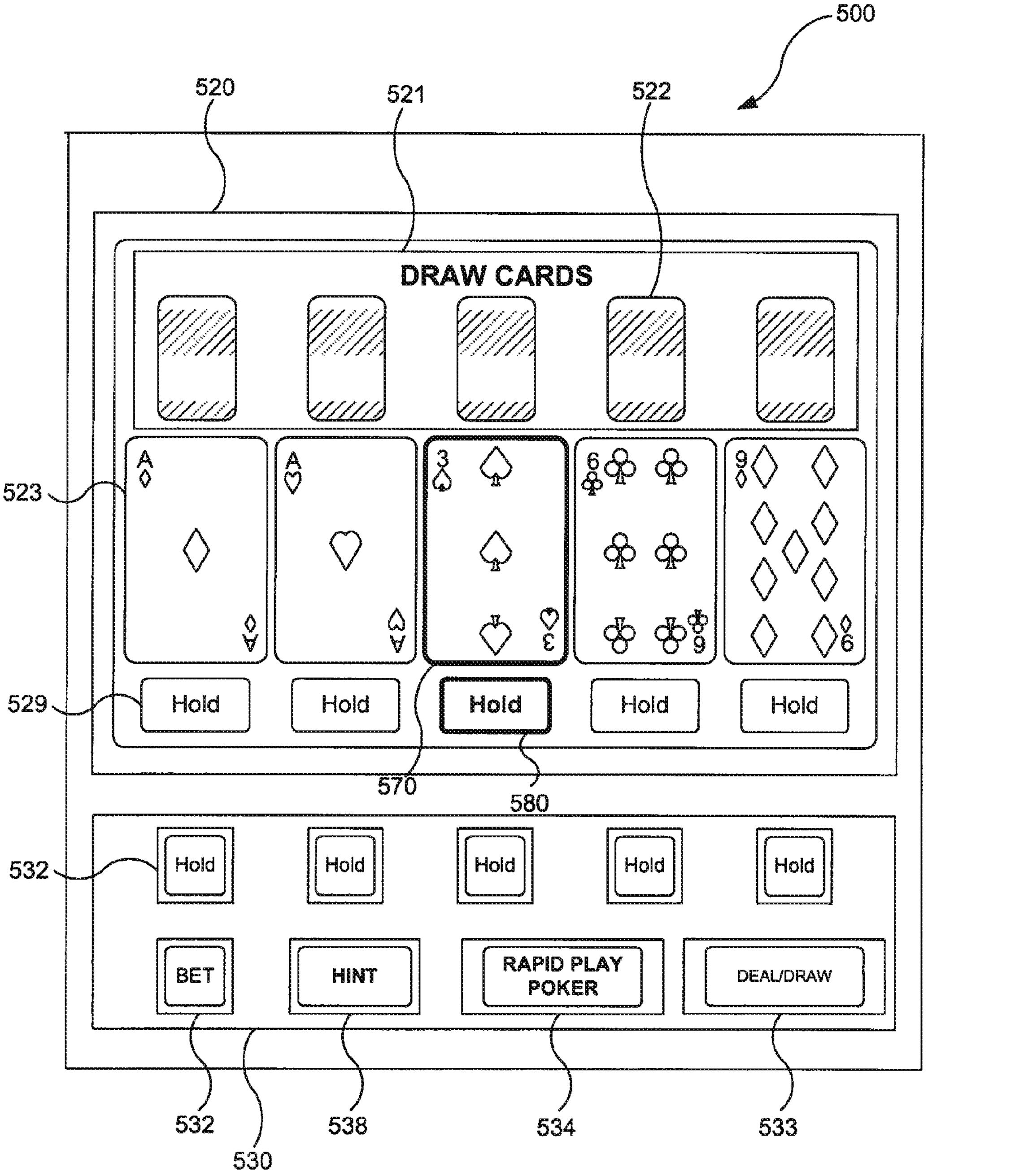
FIG. 8 is a detail diagram of a video poker gaming device according to embodiments of the invention.

FIG. 8 is a detail diagram of a video poker gaming device according to embodiments of the invention.

Referring to FIG. 8, a gaming device 500 includes a display 520 and player interface panel 530. The display 520 includes a plurality of cards 523 representing a player's current poker hand, a draw card portion 521 that shows possible draw cards 522, and a plurality of soft buttons 529 corresponding to the cards 523 in the current poker hand. The player interface panel 530 includes one or more game buttons 532, a Deal/Draw button 533, and a Rapid Play Poker button 534. These elements and features may operate in a similar way to the corresponding elements shown in FIGS. 4 and 6A, and described above. In the embodiment shown in FIG. 8, the player interface panel 530 also includes a hint button 538. The player may activate the hint button to highlight a card that is advisable to hold in a dealt poker hand based upon what is known about the draw cards. In the example shown in FIG. 8, the player has activated the hint button 538, which highlighted a suggested hold card 570 and a corresponding hold button 580 in the display 520. In this example, a player using the best theoretical strategy would typically hold the two aces and discard the other three cards on the draw. However, using the hint information, the player may choose to hold the aces and the three of spades or only hold the three of spades. Since the hint is given with knowledge of the available draw cards, the player may receive a better winning card combination than if the player was simply playing the best theoretical strategy. In the above example, for instance, the analysis of the draw cards may reveal that the first two draw cards will be a pair of threes. Thus, instead of receiving two pairs with an award of two times the player's wager using the best theoretical strategy, the player may receive a three of kind with an award of three times the player's wager or a full house (if the player also holds the two aces) with an award of nine times the player's wager using the activated hint.

In embodiments that only allow a player to play poker hands with a possible winning combination, or that only display poker hands with a possible winning combination, this hint activation may greatly help the player choose a hold and draw strategy to find the possible winning hand. In embodiments that allow a player to play hands with no possible winning combination, activation of the hint button when no win is possible may simply tell the player that no win is possible. In other embodiments, however, when the player uses the hint button and no winning card combination is possible, the gaming device may allow the player to surrender their hand and receive a portion of their wager back (e.g., half their wager is returned) without holding or drawing for additional cards.

In some embodiments, the player may have to "buy" the use of the hint. That is, by activating the hint button 538 the player is spending some additional credits. The hint button may cost a predefined number of credits, or the use of the hint button may reduce any winnings by a certain number of credits or a percentage of the win. In one example, the use of the hint button may cost the equivalent of whatever the wager on the game is. Thus, if the player has wagered three credits on the poker hand, the use of the hint button will cost an additional three credits. In a second example, the use of the hint button may reduce any win by two credits. Thus, if the player uses the hint button 538 and receives a winning pair or two pairs, the player does not win anything. Additionally, if the player receives a flush, the player will only win four credits instead of six. However, if the hint only indicates that no win is possible, the player does not have to pay any additional credits.

In alternate embodiments, the player may have to "earn" hints based on their game play or a casino promotion. The "hints" may be stored and used at a later time or date. For example, a player may earn the use of a hint after reaching a threshold of $500 of credits wagered (coin-in) or after a streak of ten losing hands. A casino may give away a ticket that can be inserted into a gaming device and used to activate a hint as a promotion for new players. The casino may also credit a player's account with a "hint" that can be downloaded and used after the player has identified herself to a gaming device that allows the use of hints.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of operating a poker gaming device, the method comprising:

receiving value from a player for wagering on the poker gaming device via a bill acceptor associated with the poker gaming device;

validating via the acceptor one of a bill and a ticket received at the acceptor;

displaying credits on a credit meter associated with the poker gaming device available to a player for wagering on the poker gaming device;

receiving a player input via a game actuating button associated with the poker gaming device to activate a first poker game on the poker gaming device;

randomly selecting 10 cards to be used in the first poker game;

displaying on a video display associated with the poker gaming device a first portion of the 10 cards to the player as a first dealt poker hand;

analyzing the 10 cards via a programmed processor associated with the poker gaming device to determine if the 10 cards can result in a minimum winning poker hand;

allowing the player to draw cards from a second portion of the 10 cards not used in the first dealt poker hand to replace cards used in the first dealt poker hand when a minimum winning poker hand is determined to be possible from the 10 cards; and substantially increasing the rate of play of the poker game on the poker gaming device by:

automatically terminating further play by the player on the poker gaming device by preventing the player from drawing additional cards from the second portion of the 10 cards not used in the first dealt poker hand when a minimum winning poker hand is determined to not be possible from the 10 cards; and thereafter automatically initiating a second poker game on the poker gaming device.

2. The method of claim 1, wherein displaying on a video display associated with the poker gaming device a first portion of the plurality of cards to the player as a first dealt poker hand comprises displaying five cards.

3. A poker gaming device comprising:

a gaming display to display poker games played on the poker gaming device by a player;

a player interface panel including a plurality of gaming buttons and a rapid play game initiating button configured to initiate a rapid play poker gaming session;

a bill acceptor associated with the poker gaming device for validating one of a bill and a ticket received in the acceptor from a player of the poker gaming device; and a game processor configured to operate the rapid play poker gaming session by randomly selecting 10 cards to be used in the first poker game, displaying a first portion of the 10 cards to the player as a first dealt poker hand, analyzing the 10 cards to determine if the 10 cards can result in a minimum winning poker hand, allowing the player to draw cards from a second portion of the 10 cards not used in the first dealt poker hand to replace cards used in the first dealt poker hand when a minimum winning poker hand is determined to be possible from the 10 cards, and substantially increasing the rate of play of the poker game on the poker gaming device by automatically terminating further play by the player of the first poker game and thereafter automatically initiating a second poker game on the poker gaming device without allowing the player to draw additional cards from the second portion of the 10 cards not used in the first dealt poker hand when a minimum winning poker hand is determined to not be possible from the 10 cards.

4. A method of operating a poker gaming device, the method comprising:

receiving value from a player for wagering on the poker gaming device via a bill acceptor associated with the poker gaming device;

validating via the acceptor one of a bill and a ticket received at the acceptor;

receiving an input to initiate a poker game on the poker gaming device via a game actuating button associated with the poker gaming device;

selecting a plurality of cards via a programmed processor associated with the poker gaming device for the poker game, the plurality of cards including a first set of cards and a second set of cards;

analyzing the first and second sets of cards via the programmed processor to evaluate whether a combination of the first and second sets of cards is associated with an award amount greater than a predefined threshold amount;

substantially increasing the rate of play of the poker game on the poker gaming device by:

displaying on a display associated with the poker gaming device a non-preferred game sequence to end the poker game when the first and second sets of cards cannot be combined to meet a predefined criterion; and thereafter automatically initiating a second game on the poker gaming device; and displaying on the display the first set of cards to the player and waiting for a player input when the first and second sets of cards can be combined to meet a predefined criterion.

5. The method of claim 4, wherein the analysis is done using a best theoretical poker strategy in holding cards.

6. A method of operating a poker gaming device, the method comprising:

receiving value from a player for wagering on the poker gaming device via a bill acceptor associated with the poker gaming device;

validating via the acceptor one of a bill and a ticket received at the acceptor;

displaying credits on a credit meter associated with the poker gaming device available to a player for wagering on the poker gaming device;

receiving a player input via a game actuating button associated with the poker gaming device to activate a first poker game on the poker gaming device;

randomly selecting a plurality of cards to be used in the first poker game;

displaying on a video display associated with the poker gaming device a first portion of the plurality of cards to the player as a first dealt poker hand;

analyzing the plurality of randomly selected cards via a programmed processor associated with the poker gaming device to determine if the plurality of randomly selected cards can result in a minimum winning poker hand;

allowing the player to draw cards from a second portion of the plurality of cards not used in the first dealt poker hand to replace cards used in the first dealt poker hand when a minimum winning poker hand is determined to be possible from the plurality of randomly selected cards;

substantially increasing the rate of play of the poker game on the poker gaming device by:

automatically terminating further play by the player on the poker gaming device by preventing the player from drawing additional cards from the second portion of the plurality of cards not used in the first dealt poker hand when a minimum winning poker hand is determined to not be possible from the plurality of randomly selected cards; and thereafter automatically displaying the second portion of the plurality of cards not used in the first dealt poker hand before initiating the second poker game when a minimum winning poker hand is determined to not be possible from the plurality of randomly selected cards; and thereafter automatically initiating a second poker game on the poker gaming device.

7. A method of operating a poker gaming device, the method comprising:

receiving value from a player for wagering on the poker gaming device via a bill acceptor associated with the poker gaming device;

validating via the acceptor one of a bill and a ticket received at the acceptor;

displaying credits on a credit meter associated with the poker gaming device available to a player for wagering on the poker gaming device;

receiving via a game actuating button associated with the poker gaming device a player input to activate a first poker game on the poker gaming device;

randomly selecting a plurality of cards to be used in the first poker game;

displaying on a video display associated with a poker gaming device a first portion of the plurality of cards to the player as a first dealt poker hand;

analyzing the randomly selected plurality of cards to determine if a poker hand with an associated award above a threshold award amount is possible from the randomly selected plurality of cards;

allowing the player to draw cards from a second portion of the plurality of cards not used in the first dealt poker hand to replace cards used in the first dealt poker hand when a minimum winning poker hand is determined to be possible from the plurality of randomly selected cards; and substantially increasing the rate of play of the poker game on the poker gaming device by:

automatically terminating further play by the player on the poker gaming device by preventing the player from drawing additional cards from the second portion of the plurality of cards not used in the first dealt poker hand when a minimum winning poker hand is determined to not be possible from the plurality of randomly selected cards; and thereafter automatically initiating a second poker game on the poker gaming device.

8. The method of claim 7, wherein the threshold award amount is zero.

9. The method of claim 7, wherein the threshold award amount is greater than zero.

10. The method of claim 9, further comprising:

determining if the minimum winning poker hand with an associated award less than the threshold award amount is a final poker hand that would be reached using a most favorable poker strategy given only the first dealt poker hand; and automatically awarding the award value of the minimum winning poker hand when it is determined that the minimum winning poker hand is a final poker hand that would be reached using the most favorable poker strategy given only the first dealt poker hand.

11. The method of claim 10, wherein the most favorable poker strategy given only the first dealt poker hand uses a maximum theoretical advantage in determining which of the first portion of the plurality of cards would be held.

12. The method of claim 10, wherein the threshold award amount is alterable by the player.

13. The method of claim 7, wherein analyzing the randomly selected plurality of cards to determine if a poker hand with an associated award above a threshold award amount is possible from the randomly selected plurality of cards includes determining if the poker hand with an associated award above the threshold award amount is a final poker hand that would be reached using a most favorable poker strategy given only the first dealt poker hand.

14. A method of operating a poker gaming device, the method comprising:

receiving value from a player for wagering on the poker gaming device via a bill acceptor associated with the poker gaming device;

validating via the acceptor one of a bill and a ticket received at the acceptor;

displaying credits on a credit meter associated with the poker gaming device available to a player for wagering on the poker gaming device;

receiving a player input via a game actuating button associated with the poker gaming device to activate a first poker game on the poker gaming device;

randomly selecting a plurality of cards to be used in the first poker game;

displaying on a video display associated with the poker gaming device a first portion of the plurality of cards to the player as a first dealt poker hand;

analyzing the plurality of randomly selected cards via a programmed processor associated with the poker gaming device to determine if the plurality of randomly selected cards can result in a minimum winning poker hand;

displaying images of the second portion of the plurality of cards to the player without revealing respective values of the cards and allowing the player to select one of the second portion of the plurality of cards to replace a displayed card used in the first dealt poker hand when a minimum winning poker hand is determined to be possible from the plurality of randomly selected cards; and substantially increasing the rate of play of the poker game on the poker gaming device by:

automatically terminating further play by the player on the poker gaming device by preventing the player from drawing additional cards from the second portion of the plurality of cards not used in the first dealt poker hand when a minimum winning poker hand is determined to not be possible from the plurality of randomly selected cards; and thereafter automatically initiating a second poker game on the poker gaming device.

15. A method of operating a poker gaming device, the method comprising:

receiving value from a player for wagering on the poker gaming device via a bill acceptor associated with the poker gaming device;

validating via the acceptor one of a bill and a ticket received at the acceptor;

displaying credits on a credit meter associated with the poker gaming device available to a player for wagering on the poker gaming device;

receiving a player input via a game actuating button associated with the poker gaming device to activate a first poker game on the poker gaming device;

randomly selecting a plurality of cards to be used in the first poker game;

displaying on a video display associated with the poker gaming device a first portion of the plurality of cards to the player as a first dealt poker hand;

analyzing the plurality of randomly selected cards via a programmed processor associated with the poker gaming device to determine if the plurality of randomly selected cards can result in a minimum winning poker hand;

informing the player of a type of winning poker hand that is possible when it is determined that a minimum winning poker hand is possible from the plurality of randomly selected cards;

allowing the player to draw cards from a second portion of the plurality of cards not used in the first dealt poker hand to replace cards used in the first dealt poker hand when a minimum winning poker hand is determined to be possible from the plurality of randomly selected cards; and substantially increasing the rate of play of the poker game on the poker gaming device by:

automatically terminating further play by the player on the poker gaming device by preventing the player from drawing additional cards from the second portion of the plurality of cards not used in the first dealt poker hand when a minimum winning poker hand is determined to not be possible from the plurality of randomly selected cards; and thereafter automatically initiating a second poker game on the poker gaming device.

16. The method of claim 15, wherein informing the player includes informing the player of all types of winning poker hands that are possible.

17. A method of operating a poker gaming device, the method comprising:

receiving value from a player for wagering on the poker gaming device via a bill acceptor associated with the poker gaming device;

validating via the acceptor one of a bill and a ticket received at the acceptor;

displaying credits on a credit meter associated with the poker gaming device available to a player for wagering on the poker gaming device;

receiving a player input via a game actuating button associated with the poker gaming device to activate a first poker game on the poker gaming device;

randomly selecting a plurality of cards to be used in the first poker game;

displaying on a video display associated with the poker gaming device a first portion of the plurality of cards to the player as a first dealt poker hand;

analyzing the plurality of randomly selected cards via a programmed processor associated with the poker gaming device to determine if the plurality of randomly selected cards can result in a minimum winning poker hand;

revealing at least one of the second portion of the plurality of cards to the player prior to allowing the player to draw cards when it is determined that the plurality of cards can result in a minimum winning poker hand;

allowing the player to draw cards from a second portion of the plurality of cards not used in the first dealt poker hand to replace cards used in the first dealt poker hand when a minimum winning poker hand is determined to be possible from the plurality of randomly selected cards; and substantially increasing the rate of play of the poker game on the poker gaming device by:

automatically terminating further play by the player on the poker gaming device by preventing the player from drawing additional cards from the second portion of the plurality of cards not used in the first dealt poker hand when a minimum winning poker hand is determined to not be possible from the plurality of randomly selected cards; and thereafter automatically initiating a second poker game on the poker gaming device.

18. The method of claim 17, wherein at least one of an additional side bet, a redemption of player points, or a player identification is required prior to revealing the at least one of the second portion of the plurality of cards.

19. The method of claim 17, wherein the player is given an option to see at least one of the second portion of the plurality of cards, and wherein at least one of the awards for a winning poker hand is reduced if the player accepts the option to see the at least one of the second portion of the plurality of cards.

20. A method of operating a poker gaming device, the method comprising:

receiving value from a player for wagering on the poker gaming device via a bill acceptor associated with the poker gaming device;

validating via the acceptor one of a bill and a ticket received at the acceptor;

displaying credits on a credit meter associated with the poker gaming device available to a player for wagering on the poker gaming device;

receiving a player input via a game actuating button associated with the poker playing device to activate a first poker game on the poker gaming device;

randomly selecting a plurality of cards to be used in the first poker game;

displaying on a video display associated with the poker gaming device a first portion of the plurality of cards to the player as a first dealt poker hand;

analyzing the randomly selected plurality of cards to determine if the randomly selected plurality of cards can result in a minimum winning poker hand;

offering the player a buy-out award to end the first poker game when a minimum winning poker hand is determined to be possible from the plurality of randomly selected cards;

allowing the player to draw cards from a second portion of the plurality of cards not used in the first dealt poker hand to replace cards used in the first dealt poker hand when a minimum winning poker hand is determined to be possible from the plurality of randomly selected cards; and substantially increasing the rate of play of the poker game on the poker gaming device by:

automatically terminating further play by the player on the poker gaming device by preventing the player from drawing additional cards from the second portion of the plurality of cards not used in the first dealt poker hand when a minimum winning poker hand is determined to not be possible from the plurality of randomly selected cards; and thereafter automatically initiating a second poker game on the poker gaming device.

21. The method of claim 20, wherein an amount of the buy-out award is randomly determined.

22. The method of claim 20, wherein an amount of the buy-out award is determined based on a value of a potential winning poker hand within the plurality of randomly selected cards.

23. The method of claim 20, wherein the player is offered the buy-out award when the player is an identified player.

24. The method of claim 20, wherein the player is randomly offered the buy-out award.

25. A poker gaming device comprising:

a gaming display to display poker games played on the poker gaming device by a player;

a player interface panel including a plurality of gaming buttons and a rapid play game initiating button configured to initiate a rapid play poker gaming session;

a bill acceptor associated with the poker gaming device for validating one of a bill and a ticket received in the acceptor from a player of the poker gaming device; and a game processor configured to operate the rapid play poker gaming session by randomly selecting a plurality of cards to be used in the first poker game, displaying 5 of the plurality of cards to the player as a first dealt poker hand, analyzing the plurality of randomly selected cards to determine if the plurality of randomly selected cards can result in a minimum winning poker hand, allowing the player to draw cards from a second portion of the plurality of cards not used in the first dealt poker hand to replace cards used in the first dealt poker hand when a minimum winning poker hand is determined to be possible from the plurality of randomly selected cards, and substantially increasing the rate of play of the poker game on the poker gaming device by automatically terminating further play by the player of the first poker game and thereafter initiating a second poker game on the poker gaming device without allowing the player to draw additional cards from the second portion of the plurality of cards not used in the first dealt poker hand when a minimum winning poker hand is determined to not be possible from the plurality of randomly selected cards.

26. The poker gaming device of claim 25, wherein the player interface panel includes at least five gaming buttons, each of the five gaming button corresponding to a respective card in the first dealt poker hand.

27. A poker gaming device comprising:

a gaming display to display poker games played on the poker gaming device by a player;

a player interface panel including a plurality of gaming buttons, a rapid play game initiating button configured to initiate a rapid play poker gaming session, and a single-game game initiating button to initiate a single game event;

a bill acceptor associated with the poker gaming device for validating one of a bill and a ticket received in the acceptor from a player of the poker gaming device; and a game processor configured to operate the rapid play poker gaming session by randomly selecting a plurality of cards to be used in the first poker game, displaying a first portion of the plurality of cards to the player as a first dealt poker hand, analyzing the plurality of randomly selected cards to determine if the plurality of randomly selected cards can result in a minimum winning poker hand, allowing the player to draw cards from a second portion of the plurality of cards not used in the first dealt poker hand to replace cards used in the first dealt poker hand when a minimum winning poker hand is determined to be possible from the plurality of randomly selected cards, and substantially increasing the rate of play of the poker game on the poker gaming device by automatically terminating further play by the player of the first poker game and thereafter automatically initiating a second poker game on the poker gaming device without allowing the player to draw additional cards from the second portion of the plurality of cards not used in the first dealt poker hand when a minimum winning poker hand is determined to not be possible from the plurality of randomly selected cards.

28. The poker gaming device of claim 27, wherein the game processor is further configured to operate the single game event by determining and displaying the single game event on the gaming display.

29. The poker gaming device of claim 28, further comprising a memory to store a plurality of game paytables, wherein the game processor utilizes a first game paytable when ascertaining game outcomes during a rapid play poker gaming session and utilizes a second game paytable when ascertaining a single game outcome during a single game event.

30. The poker gaming device of claim 29, wherein the first game paytable has a payback percentage that is higher than a payback percentage of the second game paytable.

31. A method of operating a poker gaming device, the method comprising:

receiving value from a player for wagering on the poker gaming device via a bill acceptor associated with the poker gaming device;

validating via the acceptor one of a bill and a ticket received at the acceptor;

receiving an input via a game actuating button associated with the poker gaming device to initiate a poker game;

selecting a plurality of cards for the poker game, the plurality of cards including a first set of cards and a second set of cards;

analyzing the first and second sets of cards via a programmed processor associated with the poker gaming device to determine if the first and second sets of cards can be combined to meet a predefined criterion;

substantially increasing the rate of play of the poker game on the poker gaming device by:

displaying on a video display associated with the poker gaming device a non-preferred game sequence when the first and second sets of cards cannot be combined to meet a predefined criterion; and thereafter automatically ending the poker game;

displaying on the video display the first set of cards to the player and waiting for a player input when the first and second sets of cards can be combined to meet a predefined criterion; and receiving a player input to hold cards from the first set of cards, drawing cards from the second set of cards to replace any card not held from the first set of cards, and displaying a final poker hand when the first and second sets of cards can be combined to meet a predefined criterion.

* * * * *